(12) United States Patent
Nakajima et al.

(10) Patent No.: US 10,019,182 B2
(45) Date of Patent: Jul. 10, 2018

(54) MANAGEMENT SYSTEM AND MANAGEMENT METHOD OF COMPUTER SYSTEM

(71) Applicant: HITACHI, LTD., Tokyo (JP)

(72) Inventors: Jun Nakajima, Tokyo (JP); Hironori Emaru, Tokyo (JP); Yutaka Kudou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/321,515

(22) PCT Filed: Dec. 22, 2014

(86) PCT No.: PCT/JP2014/083873
§ 371 (c)(1),
(2) Date: Dec. 22, 2016

(87) PCT Pub. No.: WO2016/103314
PCT Pub. Date: Jun. 30, 2016

(65) Prior Publication Data
US 2017/0206027 A1    Jul. 20, 2017

(51) Int. Cl.
*G06F 12/16* (2006.01)
*G06F 3/06* (2006.01)

(52) U.S. Cl.
CPC ............ *G06F 3/0619* (2013.01); *G06F 3/065* (2013.01); *G06F 3/067* (2013.01); *G06F 3/0665* (2013.01)

(58) Field of Classification Search
CPC ...... G06F 3/0619; G06F 3/065; G06F 3/0665; G06F 3/067
See application file for complete search history.

(56) References Cited

U.S. PATENT DOCUMENTS

| 2005/0193227 A1 | 9/2005 | Nakahara et al. |
| 2006/0179220 A1* | 8/2006 | Soejima ............... G06F 11/1084 711/114 |
| 2013/0036280 A1 | 2/2013 | Futawatari et al. |
| 2014/0129769 A1 | 5/2014 | Kono et al. |
| 2014/0359356 A1* | 12/2014 | Aoki ................... G06F 11/1441 714/24 |

FOREIGN PATENT DOCUMENTS

| JP | 2005-234917 A | 9/2005 |
| JP | 2014-516442 A | 7/2014 |

* cited by examiner

*Primary Examiner* — Ryan Bertram
*Assistant Examiner* — Trang K Ta
(74) *Attorney, Agent, or Firm* — Volpe and Koenig, P.C.

(57) ABSTRACT

A management system, which manages at least a computer system including a copy destination VOL, receives first performance related information including information related to a resource related to an operation with which a copy source VOL is associated as an I/O destination, and stores the received first performance related information. When an operation migrates from a first site to a second site (for example, when the first site is affected by a disaster), the management system reallocates a resource of the second site based on both the first performance related information and second performance related information including information related to a resource related to an operation originally executed at the second site among a resource group of the second site.

14 Claims, 17 Drawing Sheets

FIG. 3

Configuration table 1111A

| Server | | | | | | | | | Pair | | |
|---|---|---|---|---|---|---|---|---|---|---|---|
| 110A Server ID | 111A VM ID | 112A Drive ID | 113A Server I/F ID | 114A Storage ID | 115A Storage I/F ID | 116A CPU ID | 117A VOL ID | 118A Logical space ID | 119A Site ID | 120A Storage ID | 121A VOL ID |
| A | 5 | C | S1 | A | P1 | 4 | LV5 | 1 | B | X | LV5 |
| A | 7 | C | S1 | A | P2 | 4 | LV7 | 1 | B | X | LV7 |
| A | 8 | D | S1 | A | P2 | 4 | LV8 | 2 | B | X | LV8 |
| K | 1 | / | S2 | A | P3 | 5 | LV1 | 3 | B | X | LV1 |
| K | 2 | C | S2 | A | P4 | 5 | LV2 | 3 | B | X | LV2 |
| ... | ... | ... | ... | ... | ... | ... | ... | ... | ... | ... | ... |

FIG. 4

System configuration table
1112A

| 120A<br>System ID | 121A<br>Importance | 122A<br>VM ID |
|---|---|---|
| Y | High | 5 |
| | | 7 |
| | | 8 |
| X | Middle | 1 |
| | | 2 |
| ... | ... | ... |

FIG. 5

Related site table
1113A

| 130A<br>Site ID | 131A<br>Coupling | 132A<br>Time point difference | 133A<br>Management format |
|---|---|---|---|
| B | 133.144.10.5 | +10.0h | Type A / Version A |
| C | 133.145.14.10 | - 2.0h | Type A / Version B |
| ... | ... | ... | ... |

FIG. 6

Function table
1114A

| 140A<br>Function name | 141A<br>Component ID | 142A<br>Specific name | 143A<br>Usability | 144A<br>Target site ID |
|---|---|---|---|---|
| Snapshot | Storage apparatus #X | CoW | YES | A |
| | Server #E | VM Snapshot | NO | - |
| Capacity virtualization | Storage apparatus #Y | Thin Provisinoning | YES | A |
| ... | ... | ... | ... | ... |

FIG. 7

Performance history table
1121A

| 210A<br>Time point | 211A<br>Apparatus ID | 212A<br>Device ID | 213A<br>Metric | 214A<br>Performance value |
|---|---|---|---|---|
| 2014:08:35 | Storage apparatus #A | VOL#LV5 | IOPS | 19823 |
| | | VOL#LV7 | IOPS | 50022 |
| | | VOL#LV8 | IOPS | 40192 |
| | Storage apparatus #A | VOL#LV1 | IOPS | 9123 |
| | | VOL#LV2 | IOPS | 11999 |
| 2014:08:40 | Storage apparatus #A | VOL#LV5 | IOPS | 21251 |
| | | VOL#LV7 | IOPS | 49089 |
| | | VOL#LV8 | IOPS | 39009 |
| | Storage apparatus #B | VOL#LV1 | IOPS | 8192 |
| | | VOL#LV2 | IOPS | 12039 |
| ... | ... | ... | ... | ... |

FIG. 8

Performance trend table
1122A

| 220A<br>Apparatus ID | 221A<br>Device ID | 222A<br>Metric | 223A<br>Performance level value | 224A<br>Time | 225A<br>Minimum operation value |
|---|---|---|---|---|---|
| Storage apparatus #A | VOL#LV5 | IOPS | 0(0) | 00:00-08:00 | 511 |
| | | | 1(0~10K) | 08:00-08:30<br>17:30-24:00 | |
| | | | 2(10~20K) | 08:30-17:30 | |
| | VOL#LV7 | IOPS | 0(0) | 00:00-08:00 | 1012 |
| | | | 1(0~10K) | 08:00-08:30 | |
| | | | 3(20~30K) | 17:30-24:00 | |
| | | | 5(40~50K) | 08:30-17:30 | |
| | VOL#LV8 | IOPS | 0 | 00:00-08:00 | 299 |
| | | | 2(10~20K) | 08:00-08:30 | |
| | | | 4(30~40K) | 08:30-24:00 | |
| ... | ... | ... | ... | ... | ... |

FIG. 9

Allocated resource table
1123A

| 240A<br>Apparatus ID | 241A<br>Device ID | 242A<br>Allocated resource amount ||
|---|---|---|---|
| | | 243A<br>Number of CPU cores | 244A<br>Memory amount |
| Server #A | VM #5 | 2 | 8 |
| Server #A | VM #7 | 2 | 8 |
| Server #A | VM #8 | 4 | 16 |
| ... | ... | ... | ... |

FIG. 10

Resource amount table
1124A

| 300A<br>Apparatus ID | 302A<br>Device ID | 303A<br>Resource type | 304A<br>Resource restriction |
|---|---|---|---|
| Server #A | - | Number of CPU cores | 8 |
| Server #A | - | Memory amount | 16G |
| Storage apparatus #A | CPU#4 | IOPS | 80K |
| ... | ... | ... | ... |

FIG. 11

Task table
1130B

| 400B<br>Start time point | 401B<br>Estimated end time point | 402B<br>Option | 403B<br>Task name | 404B<br>Target |
|---|---|---|---|---|
| 18:00 | 23:00 | Daily | Backup | VOL#LV11, VOL#LV12, VOL#LV99 |
| 2014/07/20 19:00 | 2014/07/20 20:00 | - | VM migration | VM#15, Server #B, Server #C |
| ... | ... | ... | ... | ... |

FIG. 18

Resource adjustment scheme 9100B

| | 9101B<br>Adjustment scheme | 9102B<br>System ID | 9103B<br>Affected component ID | 9104B Affected contents | |
|---|---|---|---|---|---|
| | | | | 9101B<br>Affected metric | 9101B<br>Effect (MAX) |
| 1 | Resource allocation change | Y | VOL#LV5, VOL#LV7, VOL#LV8 | IOPS | Reduced by 50% |
| | | | VM#5, VM#7, VM#8 | CPU | Reduced by 50% |
| | | | | Memory | Reduced by 75% |
| | | B | VOL#LV11, VOL#LV12 | IOPS | Reduced by 50% |
| | | | VM#11, VM#12 | CPU | Reduced by 50% |
| | | | | Memory | Reduced by 75% |
| 2 | Resource allocation change | Y | VM5, VM7, VM8 | CPU | Reduced by 50% |
| | | | | Memory | Reduced by 75% |
| | | B | VM11, VM12 | CPU | Reduced by 50% |
| | | | | Memory | Reduced by 75% |
| | Task schedule change | B | VOL#LV11, VOL#LV12 | Change the start time of backup task 18:00 to 24:00 | |
| 3 | Volume migration | B | VOL#LV11, VOL#LV12 | Change the configuration Vol11 and Vol12 to PoolA. | |
| | | C | VOL#LV20 | | |
| | VM migration | B | VM#11, VM#12 | Change the configuration VM11 and VM12 to ESX 1 | |
| | | X | VM#10 | | |
| | | A | VM#1, VM#2 | | |

[ Details ] — 9107B          [ Execute ] — 9108B

FIG. 19

Resource adjustment scheme details 9200B

| 9201B Adjustment scheme | 9201B System ID | 9203B Storage apparatus | | | 9207B Server | | | |
|---|---|---|---|---|---|---|---|---|
| | | 9204B VOL ID | 9205B CPU ID | 9206B IOPS (K) | 9208B VMID | 9209B Server ID | 9210B Number of CPUs | 9211B Memory amount |
| 1 Resource allocation change | Y | LV5 | 1 (Max80K) | 20→10 | 5 | B (CPU:8) (Memory:16) | 2→1 | 8→2 |
| | | LV7 | 2 (Max80K) | 50→25 | 7 | B (CPU:8) (Memory:16) | 2→1 | 8→2 |
| | | LV8 | 2 (Max80K) | 40→20 | 8 | B (CPU:8) (Memory:16) | 4→2 | 16→4 |
| | B | LV11 | 2 (Max80K) | 30→15 | 11 | B (CPU:8) (Memory:16) | 4→2 | 16→4 |
| | | LV12 | 2 (Max80K) | 30→15 | 12 | B (CPU:8) (Memory:16) | 4→2 | 16→4 |

Execute 9210B

MANAGEMENT SYSTEM AND MANAGEMENT METHOD OF COMPUTER SYSTEM

TECHNICAL FIELD

The present invention generally relates to management of a computer system in a site, and to disaster recovery control, for example.

BACKGROUND ART

Disaster recovery is being adopted in an increasing number of cases. Disaster recovery refers to a mechanism in which a copy of data used by an operation (for example, a virtual machine) performed at a first site (a first computer system) is created at a remote second site (a second computer system) and, upon loss of the data used by the operation, the copy of the data is used to continue the operation at the second site. Generally, data copying for disaster recovery is realized by remote copying that is performed as follows. Specifically, data stored in a copy source VOL (a primary VOL) owned by the first site is transferred to the second site and copied to a copy destination VOL (a secondary VOL) in the second site. "VOL" is an abbreviation of a logical volume. Generally, a pair is constituted by one copy source VOL and one copy destination VOL. When there are a plurality of copy destination VOLs with respect to one copy source VOL, a plurality of pairs can be created.

In addition, as an example of load balancing related to disaster recovery, at least one of the sites including the first and second sites conceivably has both a copy source VOL and a copy destination VOL. Specifically, for example, the first site includes a first copy source VOL and a second copy destination VOL. The second site includes a second copy source VOL which constitutes a pair with the second copy destination VOL (or a copy destination VOL of another site) and a first copy destination VOL which constitutes a pair with the first copy source VOL (or a copy source VOL of another site). Recently, there is an increase in corporations using a plurality of sites in order to retain continuity of operations and such environments have become commonplace.

Normally, in such an environment, an allocated resource amount to a copy source VOL is large while an allocated resource amount to a copy destination VOL is small enough to enable processing of remote copying (writing).

PTL 1 discloses a technique for migrating data while taking an association between VOLs into consideration.

CITATION LIST

Patent Literature

[PTL 1]
US2014/0129769

SUMMARY OF INVENTION

Technical Problem

Unless a resource amount allocated to a component (for example, a copy destination VOL) related to an operation having migrated from a first site to a second site is increased at the second site, performance of the operation at the second site declines. This problem can be solved if a configuration of the first site can be recreated at the second site. However, a resource group of the second site is limited and the configuration of the first site cannot always be recreated at the second site.

Solution to Problem

A management system, which manages at least a computer system including a copy destination VOL, receives first performance related information including information related to a resource related to an operation with which a copy source VOL is associated as an I/O destination, and stores the received first performance related information. When the operation migrates from a first site to a second site (for example, when the first site is affected by a disaster (or when another prescribed event occurs)), the management system reallocates a resource of the second site based on both the first performance related information and second performance related information including information related to a resource related to an operation originally being executed at the second site among a resource group of the second site. Resource reallocation may be performed when a resource reallocation scheme is generated and displayed and an indication to execute the resource reallocation scheme is received from a user (for example, a manager) or may be performed without generating such a resource reallocation scheme.

Moreover, a first computer system (a computer system of the first site) may include a first host system executing a first operation (for example, a virtual machine) and a first storage system providing a plurality of VOLs including a first VOL to be an I/O destination of the first operation. A second computer system (a computer system of the second site) may include a second host system executing a second operation and a second storage system providing a plurality of VOLs including a second VOL which constitutes a pair with the first VOL and which is a copy destination of the first VOL and a third VOL to be an I/O destination of the second operation. The first computer system may include a first resource group, and the first host system and the first storage system may have all of or a part of the first resource group. At least a part of the first resource group may be allocated to the first operation executed by the first host system and to the plurality of VOLs provided by the first storage system. The second computer system may include a second resource group, and the second host system and the second storage system may have all of or a part of the second resource group. At least a part of the second resource group may be allocated to the second operation executed by the second host system and to the plurality of VOLs provided by the second storage system.

Advantageous Effects of Invention

A decline in performance of an operation migrated from a first site to a second site can be mitigated.

BRIEF DESCRIPTION OF DRAWINGS

FIG. 3 is a configuration diagram of an example of a configuration table.
FIG. 4 is a configuration diagram of an example of a system configuration table.

FIG. 5 is a configuration diagram of an example of a related site table.

FIG. 6 is a configuration diagram of an example of a function table.

FIG. 7 is a configuration diagram of an example of a performance history table.

FIG. 8 is a configuration diagram of an example of a performance trend table.

FIG. 9 is a configuration diagram of an example of an allocated resource table.

FIG. 10 is a configuration diagram of an example of a resource amount table.

FIG. 11 is a configuration diagram of an example of a task table.

FIG. 18 is a configuration diagram of an example of an adjustment scheme presentation screen.

FIG. 19 is a configuration diagram of an example of an adjustment scheme detail screen.

DESCRIPTION OF EMBODIMENT

Figure 1:
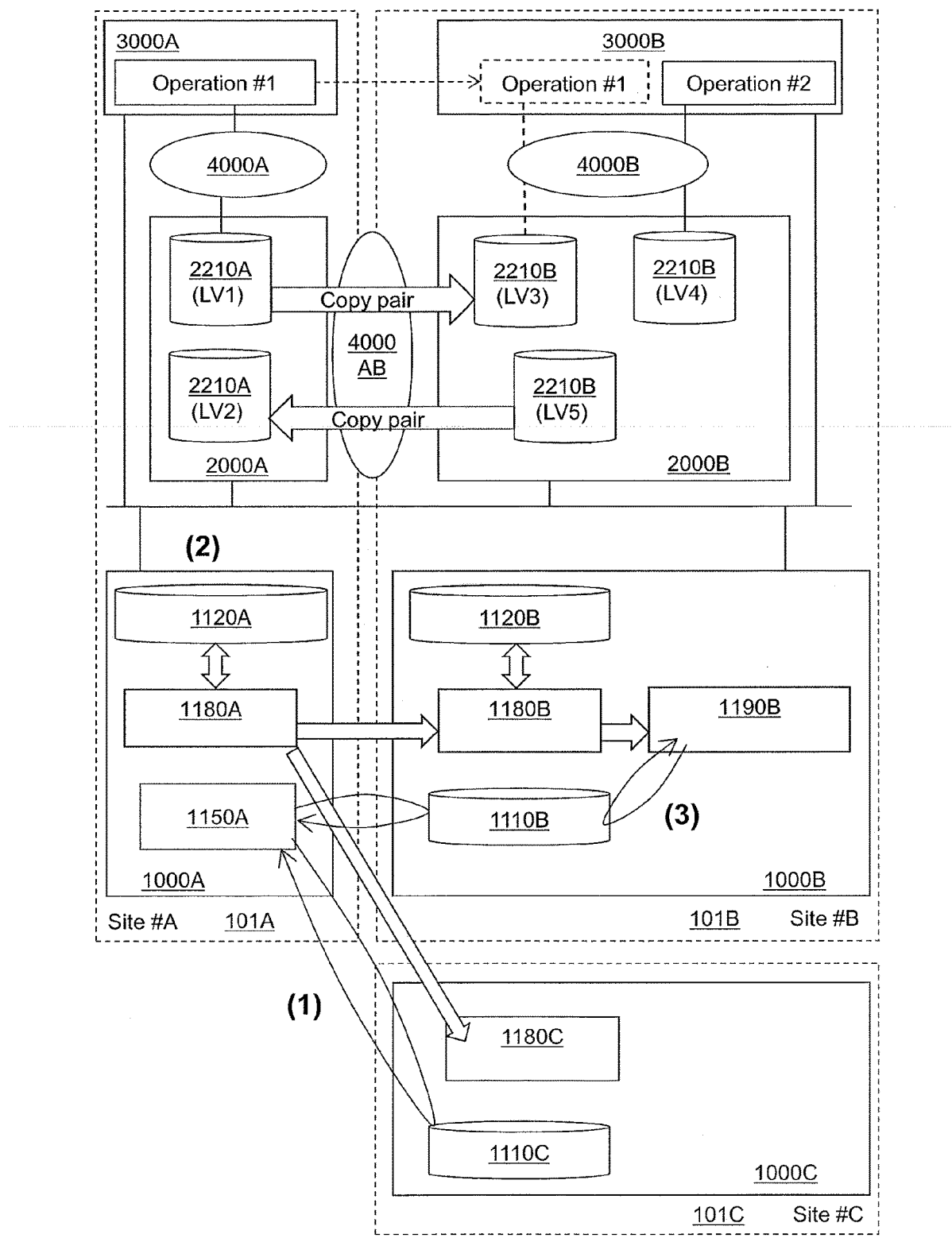
FIG. 1 is a diagram showing an outline of an embodiment.

Hereinafter, an embodiment will be described.

Although information may sometimes be described below using expressions such as an "xxx table", information may be expressed using any kind of data structure. In other words, an "xxx table" can also be referred to as "xxx information" in order to show that information is not dependent on data structure. In addition, in the following description, a configuration of each table represents an example and one table may be divided into two or more tables and all of or a part of two or more tables may constitute one table.

Furthermore, while an ID or a name is used as identification information of an element in the following description, other types of identification information may be used in place of, or in addition to, an ID or a name.

In addition, in the following description, when describing elements of a same type without distinguishing the elements from one another, reference signs or a common number in reference signs will be used. However, when describing elements of a same type by distinguishing the elements from one another, reference signs of the elements may be used or IDs assigned to the elements may be used in place of the reference signs of the elements. For example, when VOLs are to be described without particularly distinguishing the VOLs from one another, a description of "VOL 2210" may be used, and when individual VOLs are to be described by distinguishing the VOLs from one another, a description of "VOL 2201A" or "VOL #LV1" may be used.

In addition, in the following description, elements within a site X will be denoted by a reference sign suffixed by X. For example, 2210A is a reference sign of a VOL in a site A and 2210B is a reference sign of a VOL in a site B.

Furthermore, in the following description, an I/O (input/output) request signifies a write request or a read request and may also be referred to as an access request.

In addition, in the following description, a "storage unit" may be one or more storage devices including a memory. For example, among a main storage device (typically, a volatile memory) and an auxiliary storage device (typically, a nonvolatile memory), a storage unit may at least be the main storage device. Furthermore, a storage unit may include at least one of a cache area (for example, a cache memory or a partial area thereof) and a buffer area (for example, a buffer memory or a partial area thereof). A cache area and a buffer area may have a common point in that data to be input to or output from a PDEV is temporarily stored therein and may differ from each other on whether read data remains or not. Specifically, data read from a cache area may remain in the cache area but data temporarily read from a buffer area may not remain in the buffer area.

In addition, in the following description, "PDEV" denotes a physical storage device and may typically be a nonvolatile storage device (for example, an auxiliary storage device). For example, a PDEV may be an HDD (hard disk drive) or an SSD (solid state drive).

Furthermore, in the following description, "RAID" stands for a Redundant Array of Independent (or Inexpensive) Disks. A RAID group is constituted by a plurality of PDEVs and stores data in accordance with a RAID level associated with the RAID group. A RAID group may also be referred to as a parity group. A parity group may refer to, for example, a RAID group storing parity.

In addition, while a "program" is sometimes used as a subject when describing a process in the following description, since a program causes a prescribed process to be performed by appropriately using a storage resource (such as a memory) and/or an interface device (such as a communication port) and the like when being executed by a processor (such as a central processing unit (CPU)), a "processor" may be used instead as a subject of a process. A process described using a program as a subject may be considered a process performed by a processor or by an apparatus including a processor or may be considered a system. Furthermore, a processor may include a hardware circuit which performs a part of or all of a process. A program may be installed in an apparatus such as a computer from a program source. The program source may be, for example, a program distribution server or a storage medium that can be read by a computer. When the program source is a program distribution server, the program distribution server includes a processor (for example, a CPU) and a storage resource, and the storage resource may further store a distribution program and a program that is a distribution target. Furthermore, by having the processor of the program distribution server execute the distribution program, the processor of the program distribution server may distribute the program that is the distribution target to other computers. In addition, in the following description, two or more programs may be realized as one program or one program may be realized as two or more programs.

Furthermore, in the following description, a management system may be constituted by one or more computers. Specifically, for example, when a management computer displays information (specifically, for example, when a management computer displays information on its own display device or when a management computer transmits information for display to a remote display computer), the management computer constitutes a management system. In addition, for example, when functions identical or similar to those of a management computer are realized by a plurality of computers, the plurality of computers (when a display computer performs display, including the display computer) constitute a management system. A management computer (for example, a management system) may include an interface device coupled to an I/O system including a display system, a storage resource (for example, a memory), and a processor coupled to the interface device and the storage resource. The display system may be a display device included in the management computer or a display computer coupled to the management computer. The I/O system may be an I/O device (for example, a keyboard and a pointing device or a touch panel) included in the management computer or a display computer or another computer coupled to the management computer. Moreover, a management computer "displaying display information" may signify that display information is displayed on the display system and may be performed by displaying display information on a display device included in the management computer or having the management computer transmit display information to a display computer (in the case of the latter, display information is to be displayed by a display computer). In addition, a management computer inputting or outputting information may signify inputting or outputting information to or from an I/O display device included in the management computer or inputting or outputting information to or from a remote computer (for example, a display computer) being coupled to a management computer. Outputting information may signify displaying information.

In addition, in the following description, a "host system" may be a system which transmits an I/O request to a storage system and may include an interface device, a storage resource (for example, a memory), and a processor coupled to the interface device and the storage resource. The host system may be constituted by one or more host computers. At least one host computer may by a physical computer and the host system may include a virtual host computer in addition to a physical host computer.

Furthermore, in the following description, a "storage system" may be one or more storage apparatuses and may include a plurality of PDEVs (for example, one or more RAID groups) and a storage controller for controlling I/O to and from the plurality of PDEVs. The storage controller may include a back end interface device coupled to the plurality of PDEVs, a front end interface device coupled to at least one of a host system and a management system, a storage resource, and a processor coupled to the interface devices and the storage resource. The storage controller may be made redundant.

In addition, in the following description, "VOL" is an abbreviation of a logical volume and may be a logical storage device. A VOL may be a real VOL (RVOL) or a virtual VOL (VVOL). Furthermore, VOLs may include an online VOL which is provided to a host system coupled to a storage system providing the VOL and an offline VOL which is not provided to a host system (which is not recognized from the host system). "RVOL" may be a VOL based on a physical storage resource (for example, one or more RAID groups) included in a storage system that includes the RVOL. A "VVOL" may be at least one of an externally coupled VOL (EVOL), a capacity expanded VOL (TPVOL), and a snapshot VOL. An EVOL may be a VOL based on a storage resource (such as a VOL) of an external storage system and in accordance with storage virtualization technology. A TPVOL may be a VOL constituted by a plurality of virtual areas (virtual storage areas) and in accordance with capacity virtualization technology (typically, thin provisioning). A snapshot VOL may be a snapshot VOL provided as a snapshot of an original VOL. A TPVOL may typically be an online VOL. A snapshot VOL may be an RVOL. A "pool" refers to a logical storage area (for example, a set of a plurality of pool VOLs) and may be prepared for each use. For example, pools may include at least one of a TP pool and a snapshot pool. A TP pool may be a storage area constituted by a plurality of real areas (real storage areas). A real area may be allocated from a TP pool to a virtual area of a TPVOL. A snapshot pool may be a storage area in which data saved from an original VOL is stored. One pool may be used as a TP pool and a snapshot pool. A "pool VOL" may refer to a VOL to be a component of a pool. A pool VOL may be an RVOL or an EVOL. A pool VOL may typically be an offline VOL.

In addition, in the following description, a "resource" refers to a physical or a virtual element of a physical or a virtual apparatus or device. Examples of a physical element may include a CPU, a CPU core, a memory, a PDEV, a RAID group, and an I/O device (for example, an interface device). Examples of a virtual element may include a virtual CPU, a virtual CPU core, and a virtual memory. In the following description, a physical or a virtual apparatus or device to which a resource is allocated may be collectively referred to as a "component".

FIG. 1 is a diagram showing an outline of the embodiment.

As an example of a plurality of sites, three sites #A to #C (sites 101A to 101C) are provided.

The site #A includes a computer system and a management server 1000A. The computer system in the site #A includes a storage apparatus 2000A and a server (a physical server) 3000A which inputs and outputs data to and from the storage apparatus 2000A via a communication network such as a data network (for example, a SAN (storage area network)) 4000A. The storage apparatus 2000A includes one or more VOLs 2210A. The computer system is managed by the management server 1000A.

A configuration of the site #B is substantially similar to a configuration of the site #A. A storage apparatus 2000B is coupled to the storage apparatus 2000A via a data network 4000AB so as to be capable of communication. Moreover, when a suffix of a reference sign is a set of two or more alphabetical characters among A to C, an element denoted by the reference sign is assumed to be an element shared by two or more sites corresponding to the two or more alphabetical characters. The element may not exist in any of the sites or may exist outside any of the sites.

The site #C does not include a computer system and may include a management server 1000C capable of communicating with the management server 1000 in at least one of the other sites #A and #B.

In the present embodiment, the server 3000 is an example of a host computer. The storage apparatus 2000 is an example of a storage system. The management server 1000 may be an example of a management system (a management computer) or a set of the management servers 1000A to 1000C may be an example of a management system. There may be an integrated management server coupled to the management servers 1000A to 1000C, in which case the integrated management server or a system including at least one management server 1000 and the integrated management server may be an example of the management system.

In the present embodiment, for example, the following processes (1) to (3) are executed.

(1) The management server 1000A (a pair selection program 1150A) refers to configuration information repositories 1110B and 1110C included in management servers 1000B and 1000C of the remote sites #B and #C upon constructing a pair of VOLs, and selects a site which is functionally usable as a copy destination site. Let us assume that, at this point, the site #B is selected as the copy destination site and, consequently, a VOL #LV3 is selected as a copy destination VOL of a copy source VOL #LV1.

(2) During operation of a pair, the management server 1000A (a sharing program 1180A) periodically or non-periodically extracts information related to the copy source VOL #LV1 from a performance information repository 1120A of the management server 1000A. The management server 1000A (the sharing program 1180A) shares first performance related information including the extracted information with at least the site #B which manages the copy destination VOL #LV3 among the other sites #B and #C (provides the first performance related information including the extracted information to a sharing program 1180B in a management server 1000B). Moreover, after start of operation of the pair, data is remotely copied from the VOL #LV1 to the VOL #LV3. The remote copying may be remote copying performed in synchronization with processing of a write request from the server 3000A or may be remote copying performed asynchronously with the processing of a write request from the server 3000A (for example, remote copying using a so-called journal).

(3) Let us assume that, due to the site #A being affected by a disaster, an operation #1 (for example, a virtual machine) of the server 3000A migrates to a server 3000B and, as a result, an I/O destination of data accompanying the operation switches from the copy source VOL #LV1 to the copy destination VOL #LV3. In this case, in the management server 1000B in the original copy destination site #B, the sharing program 1180B extracts the shared first performance related information from the original copy source site #A (the site #A prior to the disaster). An adjustment scheme generation program 1190B generates and displays an adjustment scheme for resource allocation of the site #B based on the extracted first performance related information and on second performance related information including information related to a resource related to an operation #2 originally executed at the site #B. In this case, an "adjustment for resource allocation" refers to reallocation of a resource of a migration destination site (#B) of an operation. In other words, an "adjustment for resource allocation" refers to changing a correspondence between a component in a migration destination site and a resource in the migration destination site.

When a copy source site is affected by a disaster, a previous operating state of the copy source site cannot be comprehended. Attempting to store all performance history of all sites before a disaster occurs may create a situation where a management cycle involving collecting data and processing of collected data (for example, analyzing data and storing the data in a database (DB)) cannot be properly performed due to, for example, arrival of a next collection process start timing before processing of all collected information is completed.

According to the present embodiment, since the process (2) described above is performed, even if the copy source site is affected by a disaster, a past performance-related state of the copy source site (for example, a time series variation of a performance value with respect to a resource (element) related to an operation) can be comprehended. Therefore, when restarting an operation of a disaster-affected copy source site at a copy destination site, it is expected that an appropriate resource for the operation that is a restart object can be allocated within a range of resource limitations of the copy destination site.

Hereinafter, a configuration of a site will be described mainly using sites #A and #B as an example. At least two sites among a plurality of sites may have a same configuration. With respect to a certain pair, a configuration (for example, a type, number, amount, or performance of resources) of a resource group of a computer system of a site (for example, the site #A) to be a copy source may differ from a configuration of a resource group of a computer system of a site (for example, the site #B) to be a copy destination.

Figure 2:
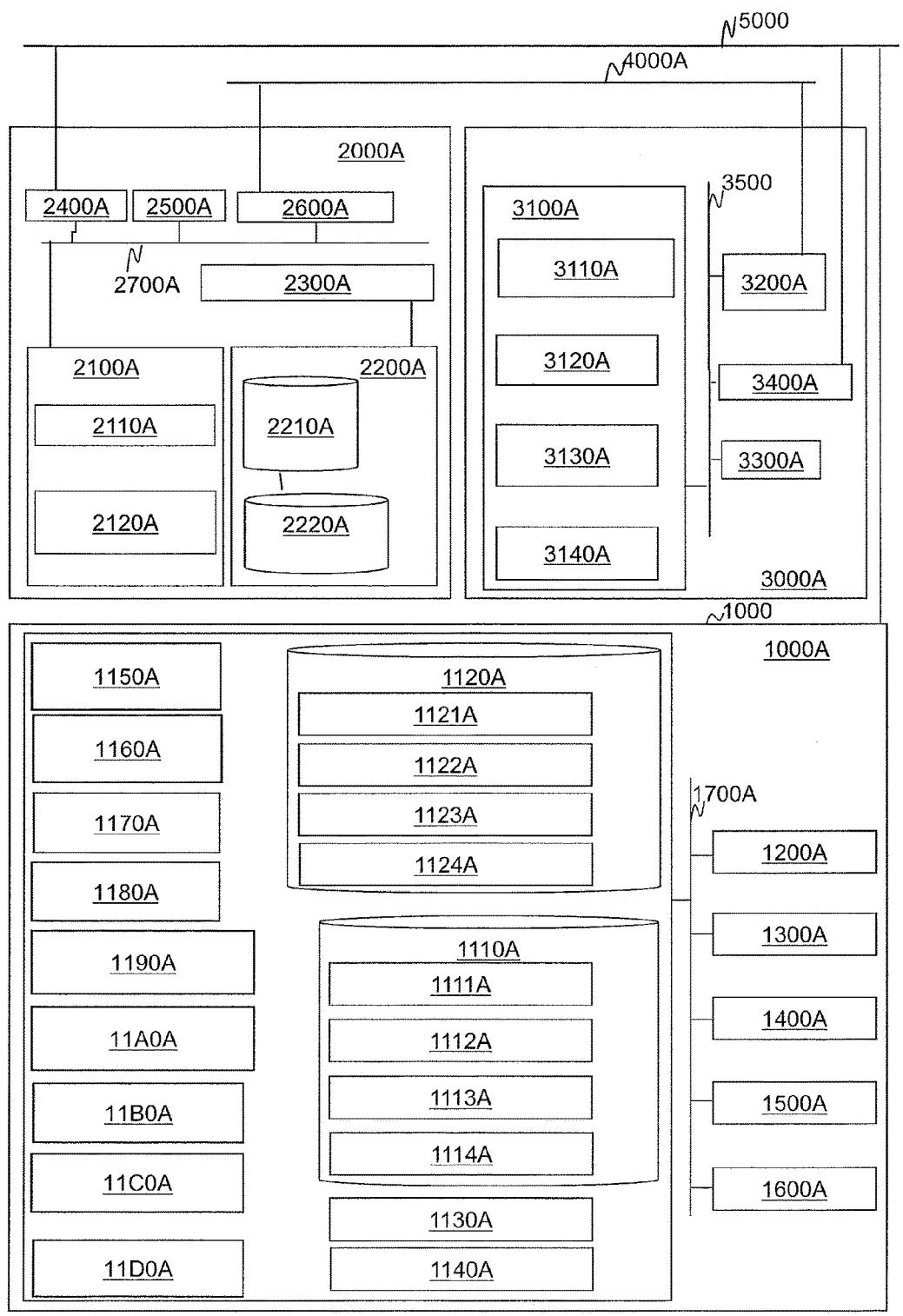
FIG. 2 is a configuration diagram of an example of a computer system according to the embodiment.

FIG. 2 is a configuration diagram of the site #A.

The site includes the management server 1000A, the storage apparatus 2000A, and the server 3000A. There may be one or more of at least one of these elements. The server 3000A and the storage apparatus 2000A are coupled to each other via the data network (for example, an FC (Fibre Channel) network) 4000A. The management server 1000A, the storage apparatus 2000A, and the server 3000A are coupled to each other via a management network (for example, an IP (Internet Protocol) network) 5000.

The management server 1000A includes a memory 1100A, an interface device (I/F) 1200A, a CPU 1300A, an output device 1400A, an input device 1500A, and a PDEV 1600A, which are coupled to each other via an internal bus 1700A.

The memory 1100A stores a configuration information repository 1110A, a performance information repository 1120A, a task table 1130A, a resource adjustment scheme table 1140A, a pair selection program 1150A, a pair generation program 1160A, an extraction program 1170A, a sharing program 1180A, an adjustment scheme generation program 1190A, an adjustment scheme presentation program 11A0A, a resource adjustment program 11B0A, a task adjustment program 11C0A, and a pair confirmation program 11D0A.

The configuration information repository 1110A includes a configuration table 1111A, a system configuration table 1112A, a related site table 1113A, and a function table 1114A. The configuration table 1111A manages information indicating a component/resource existing on an I/O route between the server 3000A and a logical space 2220A associated with a VOL (in other words, information indicating a coupling relationship of a component/resource on an I/O route). The system configuration table 1112A manages information related to a VM system which is a set of one or more VMs (virtual machines). The system configuration table 1112A may manage information related to a component system (a set of one or more components of a same type) other than a VM system.

The related site table 1113A manages information related to the management servers 3000B and 3000C (for example, IP addresses and authentication information of the management servers) of the other sites #B and #C. The function table 1114A manages information related to a function in the site (for example, information indicating a function of a storage apparatus or a server (for example, a snapshot function or a capacity virtualization (for example, thin provisioning) function) and information representing whether or not the function is to be used when affected by a disaster or the like).

The performance information repository 1120A includes a performance history table 1121A, a performance trend table 1122A, an allocated resource table 1123A, and a resource amount table 1124A. The performance history table 1121A manages, in a time series, performance information with respect to a monitoring target (for example, an apparatus and each device in an apparatus (a program executed by an apparatus may be included)) which is coupled to the data network 4000A.

The performance trend table 1122A manages a trend in performance related to a work load in units such as monthly or weekly. The allocated resource table 1123A manages an amount of resources allocated to a monitoring target. The resource amount table 1124A manages an amount of hardware resources of a monitoring target. For example, the resource amount table 1124A manages computing resources of a server such as the number of CPUs, a memory capacity, a network bandwidth, and a PDEV capacity. The task table 1130A manages information related to a task at each site (for example, starting acquisition of backup of a VOL at 23:00). The resource adjustment scheme table 1140A manages information indicating a resource allocation adjustment scheme (hereinafter, also abbreviated as an "adjustment scheme") generated by the adjustment scheme generation program 1190A.

The I/F 1200A is a device for coupling to the management network 5000. The CPU (for example, a CPU) 1300A executes a program deployed on the memory 1100A. The output device 1400A is a device such as a display device which outputs a result of processing (for example, a result of execution of the adjustment scheme presentation program 11A0A) executed by the management server 1000A. The input device 1500A is a device (for example, a keyboard) used by a manager to input an indication to the management server 1000A. The PDEV 1600A is, for example, an HDD or an SSD.

While the programs and the tables are stored in the memory 1100A in the example shown in FIG. 2, alternatively, the programs and the tables may be stored in the PDEV 1600A or in another storage medium (not shown). In this case, when executing a target program, the CPU 1300A reads the program onto the memory 1100A and executes the read program.

Alternatively, the programs and the tables described above may be stored in a memory 2100A of the storage apparatus 2000A or in a memory 3100A of the server 3000A and the storage apparatus 2000A or the server 3000A may execute a stored program. Alternatively, another apparatus such as another server 3000A or a switch (not shown) may store the programs and the tables described above and execute a stored program. The management server 1000A can communicate with a program running on the server 3000A through the management network 5000.

The storage apparatus 2000A includes a VOL providing unit 2200A and a storage controller coupled thereto. The VOL providing unit 2200A is a PDEV group and may be, for example, one or more RAID groups. The storage controller includes the memory 2100A, a PDEV I/F 2300A, a management I/F 2400A, a CPU 2500A, and a storage I/F 2600A, which are coupled via a communication path 2700 that is an internal bus or the like.

The memory 2100A includes a cache area 2110A. In addition, the memory 2100A stores a collection program 2120A. The cache area 2110A is a storage area for temporarily storing information. The collection program 2120A is a program for transmitting and receiving management information, performance information, and the like of the storage apparatus 2000A to and from the management server 1000A.

The VOL providing unit 2200A includes the logical space 2220A constituted by storage areas of one or more PDEVs (not shown). A VOL 2210A is a storage area obtained by logically dividing the logical space 2220A. Accordingly, access to the VOL 2210A from an external apparatus of the storage apparatus 2000A is enabled. Moreover, a space ID is assigned to the logical space 2220A and a VOL ID is assigned to the VOL 2210A. Accordingly, the storage apparatus 2000A can respectively uniquely identify the logical space 2220A and the VOL 2210A.

The PDEV I/F 2300A is an interface device for coupling to the VOL providing unit 2200A. The management I/F 2400A is an interface device for coupling to the management network 5000. The CPU 2500A executes a program deployed on the memory 2100A. The storage I/F 2600A is an interface device for coupling to the data network 4000A. While the collection program 2120A is stored in the memory 2100A in the example shown in FIG. 2, alternatively, the collection program 2120A may be stored in another storage area (not shown). In this case, when executing a process, the CPU 2500A reads the collection program 2120A onto the memory 2100A and executes the collection program 2120A.

Alternatively, the collection program 2120A may be stored in the memory 1100A of the management server 1000A and the management server 1000A may execute the stored program 2120A. Alternatively, another storage apparatus (for example, B or C) may store the collection program 2120A and may execute the stored program 2120A. In addition, the VOL providing unit 2200A may create a single VOL 2210A using an entire storage area of the single logical space 2220A.

The server 3000A includes the memory 3100A, a server I/F 3200A, a CPU 3300A, and a management I/F 3400A, which are coupled via a communication path 3500 that is an internal bus or the like.

The memory 3100A stores a collection program 3110A, an operation program 3120A, a VOL management program 3130A, and a path management program 3140A.

The collection program 3110A is a program for transmitting and receiving performance information and the like of the server 3000A to and from the management server 1000A. The operation program 3120A is a program (for example, a DBMS (Database Management System), a file system, or a VM which executes these systems) for realizing an operation to be executed by the server 3000A. The VOL management program 3130A is a program for allocating the VOL 2210A provided by the storage apparatus 2000A to the server 3000A. The server 3000A executes various operations using the VOL 2210A provided by the storage apparatus 2000A. The path management program 3140A is a program for managing a state of a path between the server 3000A and the VOL 2210A.

While the programs are stored in the memory 3100A in the example shown in FIG. 2, the programs may be stored in another storage area (not shown). In this case, when executing a process, the CPU 3300A reads a target program on the memory 3100A and executes the read program.

In the example shown in FIG. 2, the server 3000A and the storage apparatus 2000A are coupled to each other via the data network 4000A.

The coupling between the storage apparatus 2000A and the server 3000A is not limited to a direct coupling via a fiber channel and may be a coupling via one or more network devices such as a fiber channel switch. In addition, the coupling between the storage apparatus 2000A and the server 3000A need only be a network for data communication and may be an IP (Internet Protocol) network.

FIG. 3 is a configuration diagram of an example of the configuration table 1111A.

The configuration table 1111A includes information related to an I/O path to the logical space 2220A which constitutes the VOL 2210A provided to the server 3000A and information related to a VOL which forms a copy pair with the VOL 2210A. Specifically, for example, the configuration table 1111A has a record for each VM (virtual machine: in other words, each operation) executed in the server 3000A. Each record stores information such as a server 110A, a VM 111A, a drive 112A, a server data I/F 113A, a storage 114A, a storage data I/F 115A, a CPU 116A, a VOL 117A, a logical space 118A, a pair partner site 119A, a pair partner storage 120A, and a pair partner VOL 121A.

The server 110A is an ID of the server 3000A. The VM 111A is an ID of a VM. The drive 112A is an ID for uniquely identifying, in the server 3000A, a mount point of the server 3000A. The server data I/F 113A is an ID of the server I/F 3200A which is used when a VM accesses the VOL 2210A indicated by the VOL 117A. The storage 114A is an ID of the storage apparatus 2000A to be an access destination of a VM.

The storage data I/F 115A is an ID of the storage I/F 2600A which is used when a VM accesses the VOL 2210A indicated by the VOL 117A.

The CPU 116A is an ID of the CPU 1300A which is used when a VM accesses the VOL 2210A indicated by the VOL 117A. The VOL 117A is an ID of the VOL 2210A. The logical space 118A is an ID of the logical space 2220A including the VOL 2210A indicated by the VOL 117A. The pair partner VOL 121A, the pair partner storage 120A, and the pair partner site 119A are, respectively, an ID of a VOL which forms a copy pair with the VOL 2210A indicated by the VOL 117A, an ID of a storage apparatus including the VOL, and an ID of a site including the VOL.

The pieces of information 119 to 121 may be information collected from a computer system.

In this case, while the configuration table 1111A includes information of the server 3000A, the storage apparatus 2000A, and the like as apparatuses and devices existing on an access path, the information in the configuration table 1111A is not limited thereto. For example, the configuration table 1111A may include information of a switch, a data I/F of the switch, and the like, and information regarding a program (a DBMS or the like) on the server 3000A, a snapshot VOL which stores a snapshot of a VM, a clone VOL which stores a clone, and the like may be associated with the configuration table 1111A.

FIG. 4 is a configuration diagram of an example of the system configuration table 1112A.

The system configuration table 1112A stores information related to a VM system. For example, a VM system may be a set of one or more VMs (for example, operation programs). An example of a VM system is, for instance, a web 3-tier system which is a set of 3 VMs. For example, the system configuration table 1112A has a record for each VM system.

Each record stores a system ID 120A, an importance 121A, and a VM ID server 122A. The system ID 120 is an ID of a system. The importance 121A is information indicating an importance of a VM system. While the importance is any of three levels of "high", "middle", and "low", there may be more levels or there may only be two levels. The VM ID 122 is one or more IDs respectively corresponding to one or more VMs constituting a VM system.

FIG. 5 is a configuration diagram of an example of the related site table 1113A.

The related site table 1113A stores information on a related site that is a site which may be a copy destination of the site #A.

Specifically, for example, the related site table 1113A has a record for each related site. Each record stores a site ID 130A, a coupling 131A, a time point difference 132A, and management format information 133A. The site ID 130A is an ID of a related site. The coupling 131A is information necessary to access the related site (for example, an IP address of a management server in the related site). Information capable of identifying a related site may be other information in place of or in addition to at least one of the site ID 130A and the coupling 131A. The time point difference 132A is information indicating a difference between a current time point at the site #A and a current time point at the related site. The time point difference 132 may be, for example, a value calculated using time points acquired from respective NTP (network time protocol) servers or the like of the site #A and the related site. The management format information 133A is information related to a management format and may be, for example, a type, a version, and the like of a management program (for example, a package of programs 1150 to 11D0) used at the related site.

FIG. 6 is a configuration diagram of an example of a function table 1114B.

The function table 1114B stores information related to functions of the site #B. Specifically, for example, the function table 1114B has a record for each function of the site #B. Each record stores a function name 140B, a component ID 141B, a specific name 142B, a usability 143B, and a target site 144B. The function name 140B is a name of a function. In this case, the function name 140B may be a generic name instead of a specific name of the function. For example, a value of the function name 140B may be "Thin Provisioning", "Snapshot", or the like as a name specified in SMI-S(Storage Management Initiative Specification) which is a standard specification of storage management or in a CIM (Common Information Model) which is a standard model of system management. The component ID 141B is an ID of a component (an apparatus or a device). The specific name 142B represents a specific name of the function. The usability 143B is information indicating whether or not there is a possibility of an operation (a valid operation) running at another site (#A) during a normal operation being used at the site #B when the other site (#A) is affected by a disaster. The target site 144B is an ID of a site using a same function (a site at which a same function is enabled). Information regarding the usability 143B and the target site 144B may be transmitted from a management server 3000A of the copy source site #A and stored in the management server 3000B of the copy destination in step 8113 of the pair configuration destination selection process 8100 by the pair selection program 1150A.

FIG. 7 is a configuration diagram of an example of the performance history table 1121A.

The performance history table 1121A stores, in a time series, performance information of a monitoring target (for example, a component/resource) such as performance information related to the VOL 2210A, the logical space 2220A, and the like of each storage apparatus 2000A. The performance history table 1121A has a record for each time point. Each record stores a time point 210A, an apparatus ID 211A, a device ID 212A, and performance data (a metric 213A and a performance value 214A). The time point 210 indicates a time point at which performance data had been collected. The apparatus ID 211 is an ID of an apparatus including the monitoring target. The device ID is an ID of a device as the monitoring target.

The metric 213 indicates a type of a performance value in performance data (for example, an I/O amount per IOPS (a frequency of I/O (a unit time such as 1 second)) with respect to a VOL). The performance value 214 is a value of performance (for example, a measured value).

While the monitoring target is a VOL in FIG. 7, the monitoring target may be, in place of or in addition to a VOL, another element such as the storage I/F 2600A, the logical space 2220A, the server I/F 3200A, and a PDEV. In addition, while the metric is IOPS in FIG. 7, the metric may be, in place of or in addition to IOPS, CPU usage, a response time (a time length from receiving a request to returning a response), an I/O busy rate, a transfer rate, or a throughput.

Furthermore, with respect to a DBMS, the metric may be a buffer hit rate, the number of inserted records, the number of updated records, the number of deleted records, and the like. Moreover, the metric may be a response time of a web server, free capacity or a utilization rate of a file system or a PDEV, an amount of input/output data, the number of errors occurring at a network interface, a buffer overflow, a frame error, or the like.

FIG. 8 is a configuration diagram of an example of the performance trend table 1122A.

The performance trend table 1122A manages a monitoring target and a trend in performance related to a work load in units such as monthly, weekly, or daily of the monitoring target. For example, a plurality of performance level values are prepared in accordance with a value of IOPS. A performance level value is a grade (a level value) to which a performance value (for example, a value of IOPS) belongs. For example, IOPS "0"=performance level value "0", IOPS "0 to 10 K"=performance level value "1", and IOPS "10 K to 20 K"=performance level value "2". In other words, a performance value condition is associated with each performance level value. A performance value condition may be a set of a metric and a performance value range.

Time series information and information indicating which performance level value a performance value belongs to are managed as trend information of each device in the monitoring target. For example, AM 00:00 to AM 08:00 is managed as belonging to performance level value 0, AM 08:00 to AM 8:30 as belonging to performance level value 1, AM 08:30 to PM 05:30 as belonging to performance level value 2, and PM 05:30 to PM 24:00 as belonging to performance level value 1.

At least a part of the performance trend table 1122A may represent an example of first performance related information. Information related to a VM system that is a migration target among the performance trend table 1122A may be transmitted to a management server of a site that is a migration destination and stored in the migration destination site by the management server of the migration destination site.

The performance trend table 1122A has a record for each monitoring target. Each record stores an apparatus ID 220A, a device ID 221A, a metric 222A, a performance level value 223A, a time 224A, and a minimum operation value 225A. The apparatus ID 220A is an ID of an apparatus including the monitoring target. The device ID 221A is an ID of a device as the monitoring target. The metric 222A indicates a type of a performance value. The performance level value 223A is a performance level value. The time 224A indicates a time slot. A correspondence between the performance level value 223A and the time 224A is determined according to a performance value condition of the performance level value and which performance value condition a value (for example, a maximum value, a minimum value, or an average value) based on a performance value acquired in the time slot corresponds to. The number of performance level values and a performance value condition which is associated with a performance level value may be fixed values prepared in advance or may be dynamically divided in accordance with the performance value 214A in the performance history table 1121A. The minimum operation value 225A indicates a minimum required performance value with respect to a device. For example, an IOPS or the like which occurs when starting up a VM may be the minimum operation value 225A.

The performance trend table 1122A is a result of a reduction of a data amount of the performance history table 1121A by normalization or the like. While a data amount is reduced by dividing according to performance level values in this case, a data amount may be reduced by processing the performance history table 1121A based on other rules in place of or in addition to dividing according to performance level values.

FIG. 9 is a configuration diagram of an example of the allocated resource table 1123A.

The allocated resource table 1123A manages an amount of resources allocated to a monitoring target (for example, a component). The allocated resource table 1123A has a record for each component. Each record stores an apparatus ID 240A, a device ID 241A, and an allocated resource amount 242A. While a CPU core and a memory are adopted as types of resources to be allocated in the example shown in FIG. 9, resource types need not be limited to a CPU core and a memory. The apparatus ID 240A is an ID of an apparatus including the component.

The device ID 241A is an ID of a device as the component. The allocated resource amount 242 indicates an amount of allocated virtual resources and includes, for example, the number of CPU cores 243 and a memory amount 244. The number of CPU cores 243 indicates the number of virtual CPU cores allocated to the device. The memory amount 244 indicates an amount of virtual memory (a virtual storage capacity) allocated to the device. A resource allocated to a VM may be a CPU usage, a bandwidth of the storage I/F 2600A, or the like in addition to (or in place of) a CPU core and a memory amount.

As an example, a system #Y is constituted by a VM #5, a VM #7, and a VM #8 (refer to FIG. 4). In this case, according to the allocated resource table 1123A, the numbers of CPU cores allocated to these VM are 2, 2, and 4, and the memory amounts allocated to these VM are 8 GB, 8 GB, and 16 GB. Generally, for example, when respectively preparing VMs having a plurality of roles in a web 3-tier system, resource allocation is often designed in accordance with intended use and a processing of each VM such as a web server (VM) which performs a response process with respect to a request from a web browser, an application server (VM) which performs an arbitrary operation process, and a database server (VM) which performs reference and update processes of data. The allocated resource table 1123A may be constructed based on such designs.

FIG. 10 is a configuration diagram of an example of the resource amount table 1124A.

The resource amount table 1124A manages an amount of resources of a monitoring target (for example, a component). Each record of the resource amount table 1124A stores an apparatus ID 300A, a device ID 302, a resource type 303, and a resource restriction 304. The apparatus ID 300A is an ID of an apparatus. The device ID 302A is an ID of a device. The resource type 303A indicates a type of a resource (for example, a physical resource). The resource restriction 304A indicates a maximum usable amount of a resource.

The resource restriction 304A may be a physical restriction (for example, the number of resources in an apparatus) or a logical restriction (for example, a threshold set by a user (for example, a manager)). At least a part of the resource amount table 1124A may represent an example of first performance related information.

Information related to a VM system that is a migration target among the resource amount table 1124A may be transmitted to a management server of a site that is a migration destination and stored by the management server of the migration destination site.

For example, when the server #A has eight CPU cores, the resource restriction 304 corresponding to the resource type 303A "number of CPU cores" of the server #A is "8". When an IOPS limit value of hardware specifications of a CPU #4 of the storage apparatus #A is 80 K, "IOPS" is stored as the resource type 303 and "80 K" is stored as the resource restriction 304A. While the resource restriction 304A is a maximum usable resource amount in this case, a statically or dynamically determined resource amount threshold may be adopted instead of a maximum resource amount.

FIG. 11 is a configuration diagram of an example of a task table 1130B.

The task table 1130B has a record for each task which may be executed at the site #B. Each record stores a start time point 400B, an estimated end time point 401B, an option 402B, a task name 403B, and a target 404B. The start time point 400B indicates a start time point of a task. The estimated end time point 401B indicates an estimated end time point of the task. The option 402B indicates an execution option of the task (for example, a task executed only once or a task executed periodically and repetitively). For example, in the case of a task that is executed at a same time point every day, the option 402 is "Daily". The task name 403 indicates a name of a type (for example, "Backup" or "VM migration") of the task (function). The target 404 indicates an ID of a target (for example, a device or an apparatus) at which a process is executed by the task.

Next, processes executed by the management server 1000A of the copy source site #A or the management server 1000B of the copy destination site #B will be described.

Figure 12:
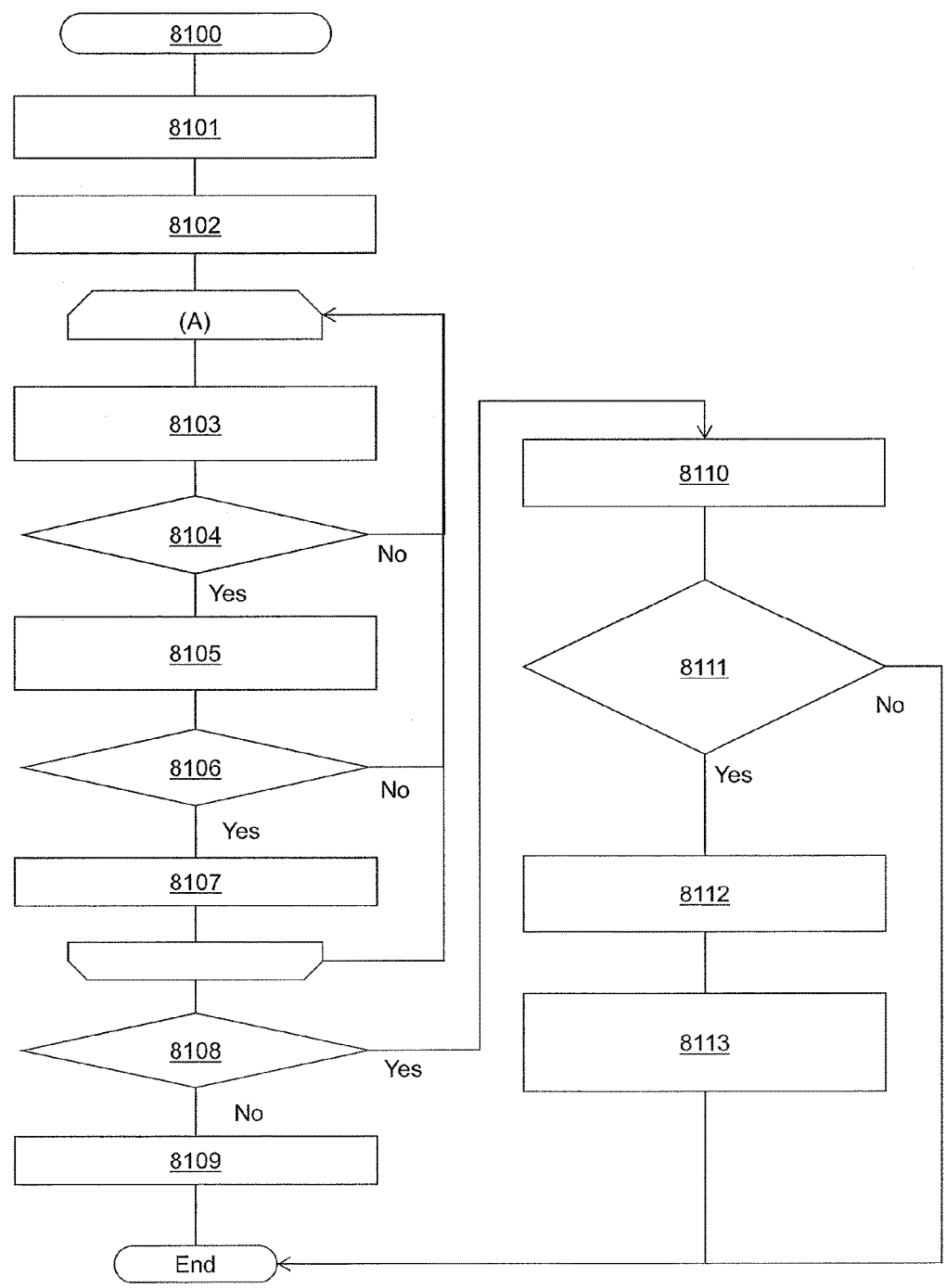
FIG. 12 is a flow chart of a pair configuration destination selection process.
Figure 16:
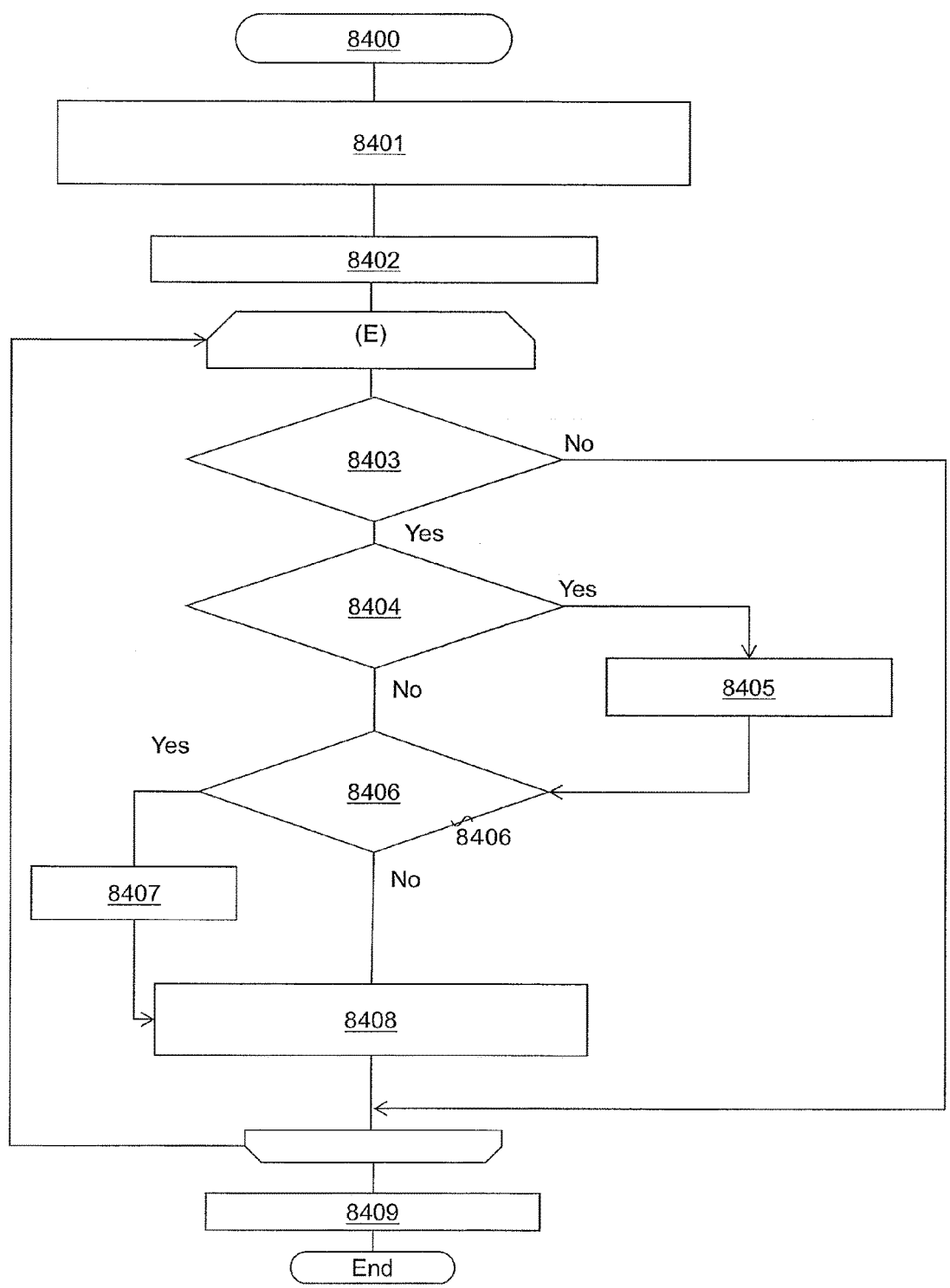
FIG. 16 is a flow chart of an adjustment scheme generation process.
Figure 17:
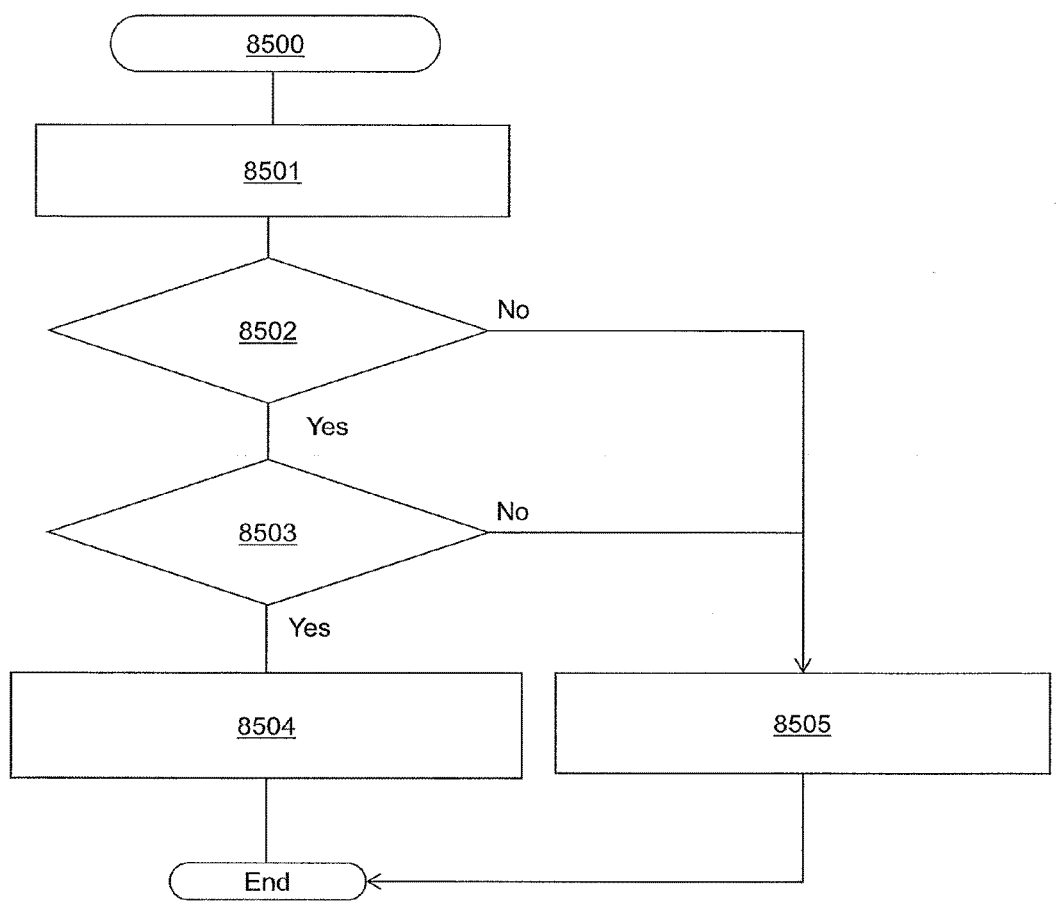
FIG. 17 is a flow chart of a resource adjustment process.

The plurality of processes are roughly classified into the three timings (phases) described below.
(Timing 1) Upon introduction of system (in other words, upon pair construction for a disaster configuration). The process shown in FIG. 12 is executed by the management server 1000A.
(Timing 2) During normal operation of system. The processes shown in FIGS. 13, 14, 15, and 20 are executed by the management servers 1000A and 1000B. For example, the processes are periodically executed.
(Timing 3) Upon occurrence of system failure (in other words, after occurrence of disaster). The processes shown in FIGS. 16 and 17 are executed by the management server 1000B.

FIG. 12 is a flow chart of a pair configuration destination selection process.

A pair configuration destination selection process 8100 is a process of selecting a pair configuration destination which does not pose a problem even when operations are switched in accordance with an occurrence of a disaster, and configuring a pair. The present process 8100 is executed by the pair selection program 1150A and the pair generation program 1160A.

First, the pair selection program 1150A receives an input of information on a copy source (step 8101). Any means may be adopted as long as the pair selection program 1150A can receive information on the copy source. For example, the pair selection program 1150A may receive information specified by the user via the input device 1500A. In addition, the information on the copy source may include an ID of a copy source VOL. In step 8101, the VM 1111A corresponding to the VOL 117 which matches the ID of the copy source VOL may be identified from the configuration table 1111A, and the system 120A corresponding to the system configuration server 122A which matches the VM 111A may be identified from the system configuration table 1112A.

Next, the pair selection program 1150A refers to the related site table 1113A and identifies a site (a related site) which is capable of constructing a pair relationship with the copy source specified in step 8101 (step 8102).

Next, based on information on the related site identified in step 8102, the pair selection program 1150A performs steps 8103 to 8107 described below for each related site (loop A). "Site #B" will be described as an example of one of the related sites. In step 8103, the pair selection program 1150A acquires configuration information to be used as a pair construction condition from the configuration information repository 1110B in the management server 1000B of the site #B. Examples of configuration information to be used as a pair construction condition include: (a) information indicating that a line for transferring information on a pair has already been physically laid and a configuration for data transfer has been performed; (b) information indicating a configuration for difference management in order to guarantee consistency in data transfer of a pair has been performed; (c) information indicating that software (a program) for remote copying has been installed; (d) information indicating that a VOL usable as a copy destination of remote copying exists; and (e) information indicating that writing by a remote copying process can be performed without incident at the copy destination during normal operation. In step 8104, the pair selection program 1150A determines whether or not a pair can be constructed with the copy source input in step 8101 based on the configuration information acquired in step 8103, and selects a configurable pair destination candidate. When a result of the determination in step 8104 is positive, in step 8105, the pair selection program 1150A acquires function information from the function table 1114B of the configuration information repository 1110B. In step 8106, the pair selection program 1150A determines whether or not a function that can be provided at the copy source can be provided in a similar manner at the copy destination selected as being capable of constructing a pair based on the function information acquired in step 8105, and selects a pair destination candidate capable of providing the function. For example, when a CoW (Copy on Write) function has been provided as a snapshot function at the storage apparatus #A that is a copy source, the pair selection program 1150A selects a storage apparatus #X (one of the storage apparatuses in the site #B) having a similar function as the pair destination (refer to FIG. 6). In step 8107, the pair selection program 1150A stores the pair destination selected in step 8106 as a pair destination candidate. In addition, for example, the pair selection program 1150A also selects a configuration capable of using a server #E having a VM Snapshot function which is a function of a similar type as a pair destination candidate. While a determination is made in this case based on whether or not a providable function can be provided, alternatively, a determination may be made based on whether or not a function actually being used at the copy source can be managed and the used function can be provided in a similar manner. When a pair destination candidate satisfying conditions does not exist in step 8104 and step 8106, the check with respect to the site #B is ended and a transition is made to a check with respect to another related site (loop A).

Next, the pair selection program 1150A determines whether or not information on the pair destination candidate stored in step 8107 exists (step 8108). When a result of the determination in step 8108 is negative, the pair selection program 1150A presents the user with the negative result (step 8109). Based on this information, the user can confirm the pair construction condition and function and subsequently take measures such as changing configurations or the like. When the result of the determination in step 8108 is positive, the pair selection program 1150A presents the user with pair destination candidates (displays display information related to the pair destination candidates) and accepts an input on which of the pair destination candidates is to be selected (step 8110). At this point, for example, the pair selection program 1150A receives information specified by the user from the input device 1500A. In step 8111, the pair selection program 1150A checks for input. When there is no input, the pair selection program 1150A ends the pair configuration destination selection process 8100, but when there is an input, the pair selection program 1150A advances to step 8112.

As the determination in step 8111, the selection process may be ended when there is no input for a prescribed time or the selection process may be ended when there is an input to end the selection process.

In addition, while a presentation is made and an input is accepted in step 8110 in this case, alternatively, the process of step 8110 may be omitted, a pair destination candidate may be automatically selected and input in the process of step 8111 based on a policy such as "Prioritize site #B", "Prioritize a pair destination candidate of which function information matches completely", and "Random sampling", and the pair selection program 1150A may proceed to a next step.

Next, in step 8112, based on the input, the pair selection program 1150A transmits an execution request to the pair generation program 1160A. The pair generation program 1160A executes pair generation based on the specified information. Since the pair generation process is a general process, a description thereof will be omitted.

Next, in step 8113, the pair selection program 1150A transmits function information that may possibly be used by the generated pair to the management server (for example, 1000B) of the copy destination site (for example, the site #B). When receiving the function information, the management server (for example, a CPU 1300B) of the copy destination updates the usability 143B and the target site 144B (information in the function table 1114B) which correspond to the function indicated by the function information. For example, the usability 143B is updated to "Yes" and the target site 144 is updated to "site A". Due to such updating, when an attempt to change the function is made at the site B, the management server 1000B can take an action such as displaying a warning to the effect that the function may possibly be used in the future by a pair formed with the site A that is the copy source.

Figure 13:
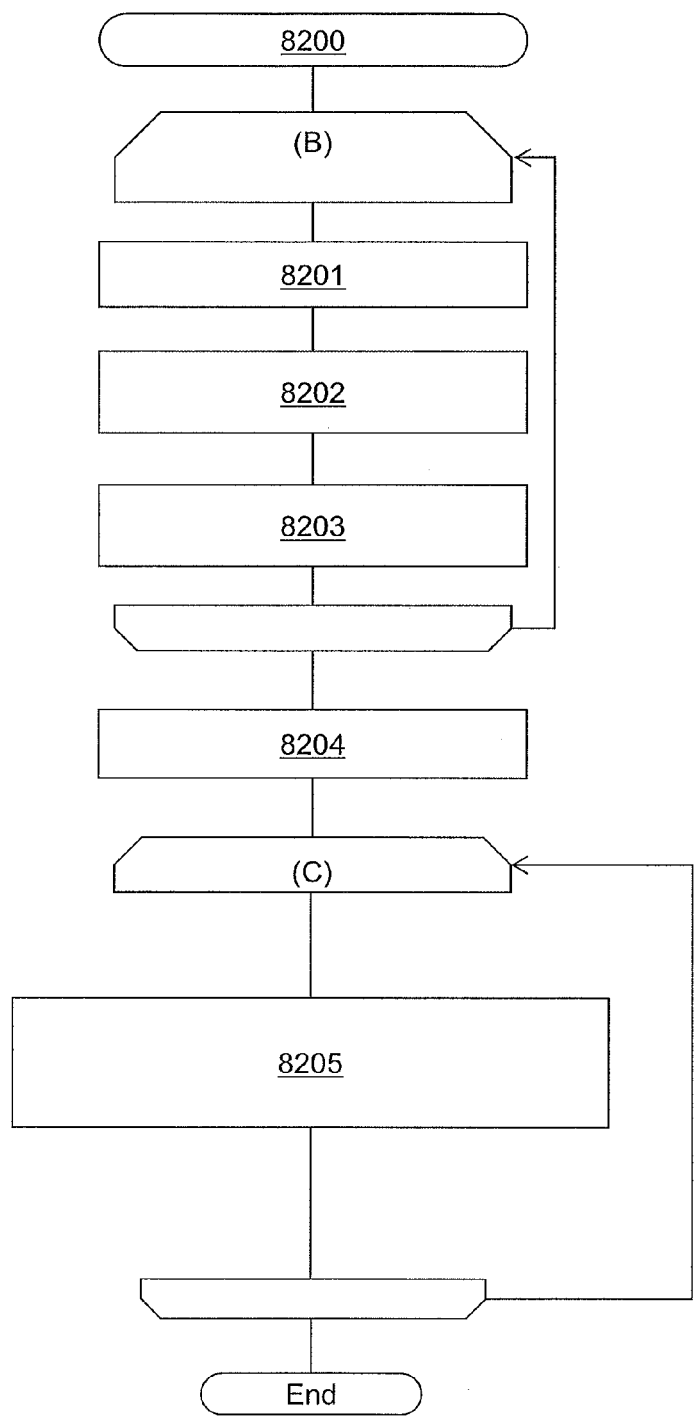
FIG. 13 is a flow chart of a performance related information extraction process.

FIG. 13 is a flow chart of a performance related information extraction process.

A performance related information extraction process 8200 is a process of extracting performance trend information from performance information (a set of a metric and a performance value corresponding to a monitoring target in the performance history table 1121A) of a monitoring target and, together with a resource amount allocated to the monitoring target and the like, extracting information related to performance of each system. The present process is repetitively (for example, periodically) performed by the extraction program 1170A.

First, the extraction program 1170A performs steps 8201 to 8203 (loop B) for each component (monitoring target) identified from the configuration table 1112A. Hereinafter, the "VOL #LV5" will be described as an example of a monitoring target. The extraction program 1170A refers to the performance history table 1121A with respect to the VOL #LV5 (step 8201). The extraction program 1170A acquires information (the time point 210A, the apparatus ID 211A, the metric 213A, and the performance value 214A) from each record including the device ID 212A "VOL #LV5". Subsequently, the extraction program 1170A generates a performance trend based on the acquired information and stores the generated performance trend in the performance trend table 1122A (step 8202). For example, the extraction program 1170A aggregates history with respect to an IOPS (metric) of the "VOL #LV5". Time "00:00 to 08:00" is associated with the performance level value "0" since there was no I/O. Time "08:00 to 08:30" and time "17:30 to 24:00" are associated with the performance level value "1" since I/O ranged from "0 to 10 K" on average. Time "08:30 to 17:30" is associated with the performance level value "2" since I/O ranged from "10 to 20 K" on average. In this manner, when generating a performance trend, a plurality of time slots are associated with a plurality of performance level values. While a performance trend is generated as a daily trend in 30-minute units in this case, a performance trend may be generated as a daily trend in 1-hour units or as a weekly or monthly trend. Subsequently, the extraction program 1170A determines a minimum value necessary for operation and stores the determined value as the minimum operation value 225 in the performance trend table 1122 (step 8203). For example, the minimum value necessary for operation may be determined based on performance history upon startup (for example, a startup time point identified based on a startup schedule or the like and history identified based on the time point 210A in the table 1121A).

Next, the extraction program 1170A refers to the system configuration table 1112A (step 8204) and performs step 8205 for each VM system (loop C). Specifically, the extraction program 1170A refers to the allocated resource table 1123A and the performance trend table 1122A with respect to a VM system and stores a set of a performance trend and an allocated resource amount of each VM in the VM system (step 8205). In the present process 8200, by storing or using information in the performance trend table 1122A shown in FIG. 8 or the resource table 1123A shown in FIG. 9 in units of monitoring targets in a same system in the system configuration table 1112A shown in FIG. 4, information which had been designed at the copy source site (or accumulated through operation at the copy source site) and which is necessary to operate the VM system without incident (in other words, information indicating a resource amount ratio of a VM) can be utilized. In step 8205, the importance 121A in FIG. 4 may be stored in association with the set of the performance trend and the allocated resource amount. In addition, in the present process 8200, when the copy source site #A is a public cloud environment or the like, the extraction program 1170A may collect performance history using an I/F for configuration/performance information acquisition which is used in cloud management, generate performance trend information based on the collected performance history information, and store the generated performance trend information and information on an allocated resource amount acquired using the I/F for configuration/performance information acquisition for each VM system.

Figure 14:
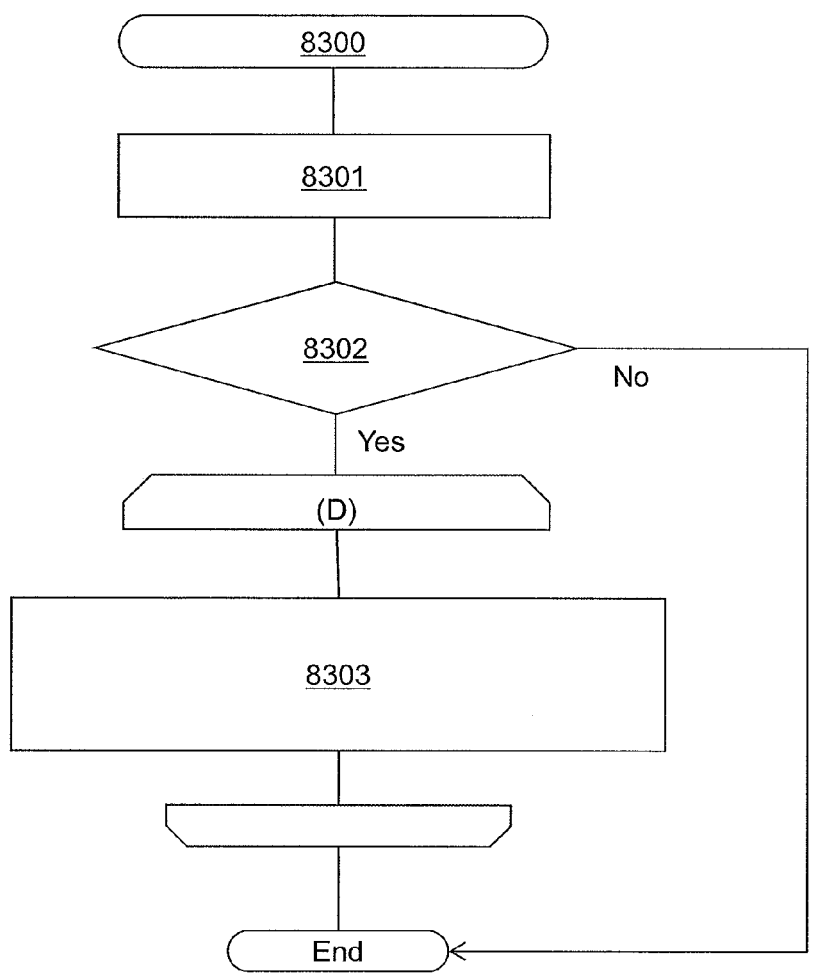
FIG. 14 is a flow chart of a performance related information sharing process (copy source).

FIG. 14 is a flow chart of a performance related information sharing process 8300 (copy source).

The performance related information sharing process 8300 (copy source) is a process at the copy source site of sharing performance related information extracted by the extraction program 1170A with a management server of a copy destination site. The present process is repetitively (for example, periodically) performed by the sharing program 1180A.

First, the sharing program 1180A refers to the configuration table 1111A, acquires pair information (step 8301), and determines whether or not there is one or more pieces of pair information (step 8302). When a result of the determination in step 8302 is negative, the process is ended.

When a result of the determination in step 8302 is positive, the sharing program 1180A performs step 8303 (loop D) for each site of a pair destination. Specifically, for a pair destination site, the sharing program 1180A acquires performance trend information of a system using a pair destination VOL of the pair destination site and resource allocation information from the extraction program 1170A and transmits the acquired performance trend information and resource allocation information to the management server of the pair destination site (step 8303).

While the performance related information sharing process 8300 is to be periodically executed in this case, only information usable for resource adjustment at a pair destination site may be transmitted only at a timing at which the information can be used. For example, the sharing program 1180A may store already-transmitted information and, with respect to information unchanged from already-transmitted information among the pieces of information in the performance trend table, may not execute the present process and adjust a timing such that, for example, information is not newly transmitted to a management server (for example, 1000B) of a copy destination. In addition, for example, in accordance with function information collected during pair creation, the sharing program 1180A may transmit only information necessary for recreating an operation at a copy destination such as transmitting only information usable for changing resource allocation at a copy destination site (for example, B).

Furthermore, for example, in an environment where an increase in data transfer amount does not pose a problem or the like, the sharing program 1180A may transmit all of the information in the performance history table 1121A to a management server (for example, 1000B) of a copy destination of each system. Moreover, at this point, the importance 121A in accordance with an operation that runs on a system may also be transmitted for each system.

Figure 20:
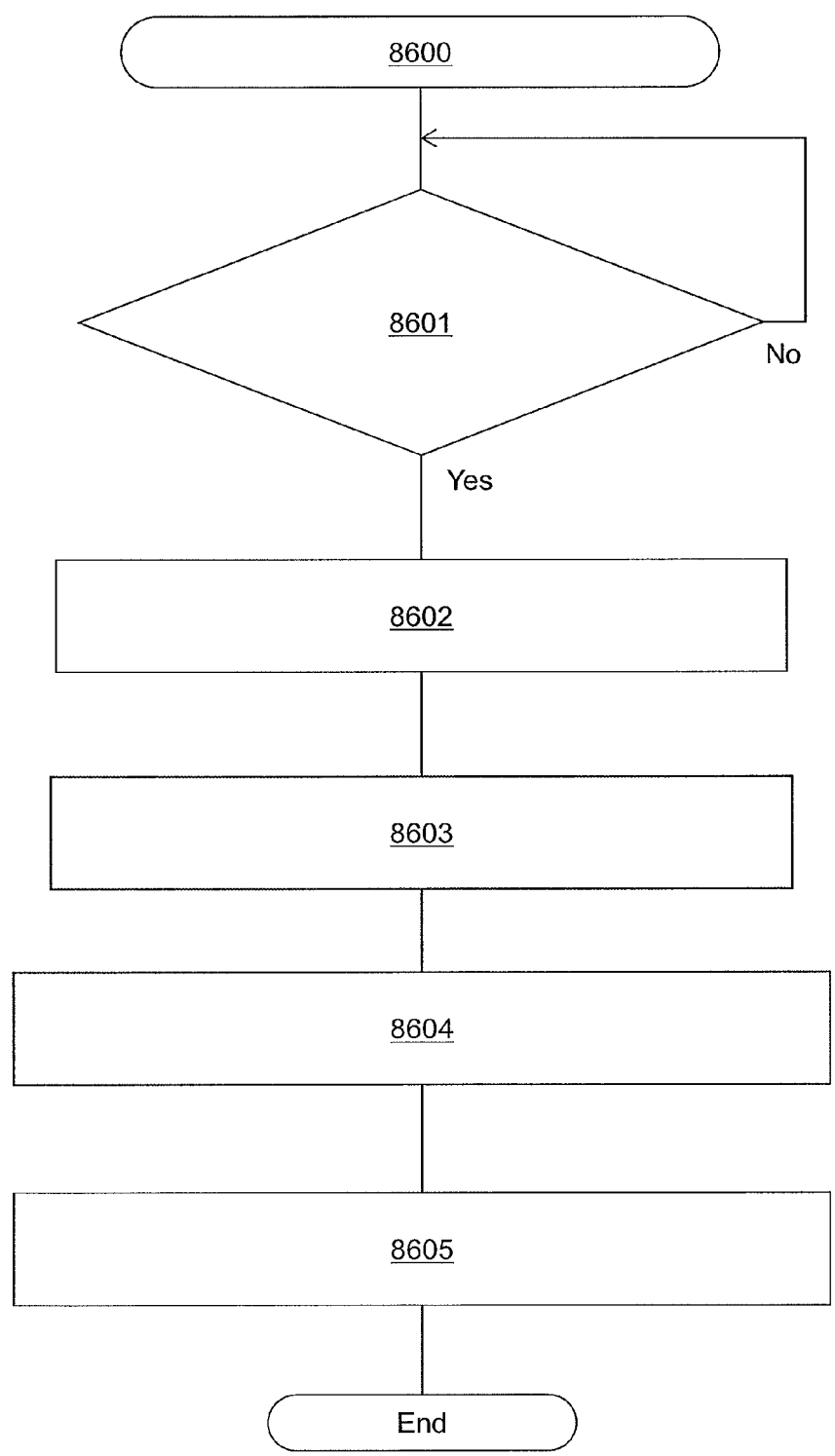
FIG. 20 is a flow chart of a performance related information sharing process (copy destination).

FIG. 20 is a flow chart of a performance related information sharing process 8600 (copy destination). In the following description, the copy destination is assumed to be the site #B.

The performance related information sharing process 8600 (copy destination) is a process of receiving performance related information transmitted from the copy source site #A in step 8303 shown in FIG. 14 at the management server 1000B of the copy destination site #B. The present process is performed by the sharing program 1180B.

First, the sharing program 1180B waits to receive performance related information of the system transmitted by the management server 1000A of the copy source and, when the performance related information is received, proceeds to step 8602.

In step 8602, the sharing program 1180B identifies the site ID 119B (for example, "A") corresponding to a storage ID 120B which matches an apparatus ID in the received performance related information from a configuration table 1111B. Next, the sharing program 1180B refers to a time point 132B in a related site table 1113B and, in accordance with a time point difference between the site #A and the site #B, changes a value related to time in the performance related information (corresponds to the time 224 in the performance trend table) (step 8603). Next, based on management format information 133B corresponding to the identified site ID 119B (for example, "A"), when the site #A and the site #B have different management formats, the sharing program 1180B converts a data format of the performance related information from the copy source site based on the difference in management formats (step 8604), and stores the information in the received performance related information to a performance trend table 1122B and an allocated resource table 1123B (step 8605). As a result, performance related information from the copy source site #A (first performance related information) and performance related information in the copy destination site #B (second performance related information) are to exist in each of the performance trend table 1122B and the allocated resource table 1123B. The second performance related information may be information related to a resource related to an operation originally being executed at the copy destination site #B.

When the management formats introduced at the copy source and the copy destination are similar, normally, configurations of tables in management servers (tables referred to or updated by management programs) are also similar. Therefore, shared data (information transmitted from the copy source site #A to the copy destination site #B) can be stored in tables without data format conversion.

On the other hand, when systems of different vendors are introduced at the copy source site and the copy destination site or when the copy source site is a public cloud environment and the copy destination site is a private cloud environment, different management formats are used by the copy source site and the copy destination site. In this case, information stored at the respective sites has a different data format and a different stored content. Since recent management programs often make a data schema definition for storing performance history information openly available, even when different management programs are being used, a performance related information sharing process can be performed by preparing a program for converting a format of a data schema to be stored in advance.

Figure 15:
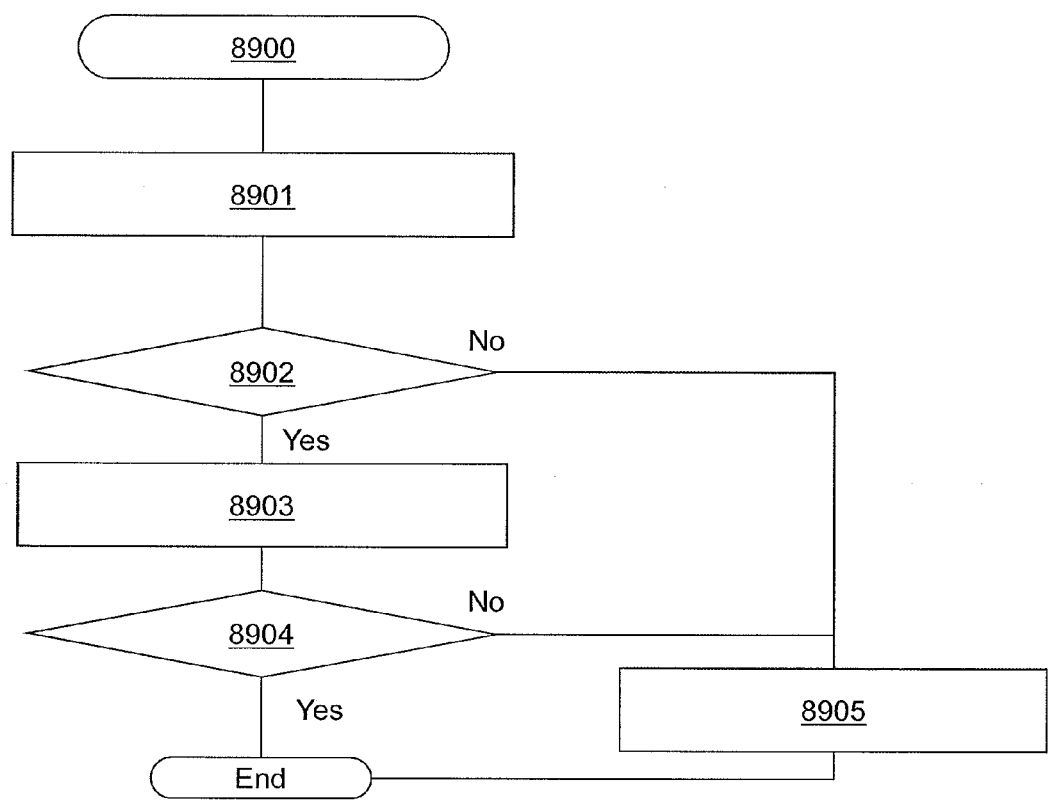
FIG. 15 is a flow chart of a pair configuration confirmation process.

FIG. 15 is a flow chart of a pair configuration confirmation process 8900.

The pair configuration confirmation process 8900 is a process performed during normal operation of repetitively (for example, periodically) checking, at a copy source site, whether or not the system can be operated without incident even when an operation is switched from the copy source to the copy destination due to the occurrence of a disaster. Specifically, for example, confirmation that no functional problems occur even an operation is switched due to a disaster is repetitively (for example, periodically) made. The present process is performed by the pair confirmation program 11D0A.

Since steps 8901 to 8904 performed by the pair confirmation program 11D0A are similar processes to steps 8103 to 8106 shown in FIG. 12, a description thereof will be omitted. When conditions are not satisfied in step 8902 and step 8904, the pair confirmation program 11D0A notifies the user that an already-constructed pair no longer satisfies conditions (step 8905). In this case, while the pair confirmation program 11D0A notifies that the pair no longer satisfies conditions, alternatively, the pair confirmation program 11D0A may notify that a change has occurred in configuration information to be a pair construction condition or in function information.

Alternatively, the pair confirmation program 11D0A may call the pair configuration destination selection process shown in FIG. 12 in place of or in addition to the notification. For example, the pair confirmation program 11D0A may issue an alert (for example, display an alert) when an inquiry with respect to whether or not a same function as a function enabled at the site #A is disabled or has been deleted at the site #B is repetitively issued to the management server 1000B and a positive response is received from the management server 1000B.

FIG. 16 is a flow chart of a resource adjustment scheme generation process 8400.

The resource adjustment scheme generation process 8400 is a process of generating an adjustment scheme of a resource at the copy destination site B in consideration of an operation (a VM system) having migrated from the copy source site #A in accordance with an occurrence of a disaster and an operation (a VM system) originally running at the copy destination site #B. The present process 8400 is performed by the adjustment scheme generation program 1190B.

First, the adjustment scheme generation program 1190B adds up respective performance level values and resource amounts related to VOLs of the VM system running at the copy destination site #B and the VM system having migrated from the copy source site #A. In this case, performance level values are added up as time-series information.

For example, when considering performance trend as an example, performance level values of the VM system having migrated from the copy source site #A related to a CPU shared by the VOL #LV7 at the copy source and the VOL #LV11 at the copy destination are as shown in FIG. 8. Specifically, with respect to the VOL #LV7, the performance level value is "0" at "00:00 to 08:00", the performance level value is "1" at "08:00 to 08:30", the performance level value is "5" at "08:30 to 17:30", and the performance level value is "3" at "17:30 to 24:00". With respect to the VOL #LV8, the performance level value is "0" at "00:00 to 08:00", the performance level value is "2" at "08:00 to 08:30", and the performance level value is "4" at "08:30 to 24:00". On the other hand, for example, a performance trend of the VM system running at the copy destination site #B is as follows. Specifically, with respect to the VOL #LV11, the performance level value is "0" at "00:00 to 09:00", the performance level value is "1" at "09:00 to 012:00", the performance level value is "3" at "12:00 to 17:30", and the performance level value is "2" at "17:30 to 24:00". With respect to the VOL #LV12, the performance level value is "3" at "00:00 to 24:00". Therefore, results of an addition of performance level values for the respective time slots are as follows.

Specifically, at "00:00 to 08:00", the performance level value is "3" (=0+0+0+3), at "08:00 to 08:30", the performance level value is "6" (=1+2+0+3), at "08:30 to 09:00", the performance level value is "12" (=5+4+0+3), at "09:00 to 12:00", the performance level value is "13" (=5+4+1+3), at "12:00 to 17:30", the performance level value is "15" (=5+4+3+2), and at "17:30 to 24:00", the performance level value is "12" (=3+4+2+3).

Next, with respect to components having a performance dependence relationship with a VOL of the VM system having migrated from the copy source site A due to the disaster, the adjustment scheme generation program 1190B adds up performance level values and resource amounts related to respective components sharing resources of the migrated VM system and the VM system running at the copy destination site #B. Examples of a component having a performance dependence relationship include a VM using the VOL and a logical space which is a source of the VOL. For example, let us assume that the copy source has the VM #5, the VM #7, and the VM #8 which are migration targets while the copy destination has the VM #11 and the VM #12. Resource amounts of the VM systems are as shown in FIG. 9. Specifically, with respect to the copy source site #A, two CPU cores and a memory amount of 8 GB are allocated as resources to the VM #5, two CPU cores and a memory amount of 8 GB are allocated as resources to the VM #7, and four CPU cores and a memory amount of 16 GB are allocated as resources to the VM #8. With respect to the copy destination site #B, four CPU cores and a memory amount of 16 GB are allocated as resources to the VM #11 and four CPU cores and a memory amount of 16 GB are allocated as resources to the VM #12. These are added up. Therefore, addition results are as follows. Specifically, with respect to the shared server #B, the number of CPU cores is "16" (=2+2+4+4+4) and the memory amount is "64" (=8+8+16+16+16). In this case, while a server sharing resources is defined in advance, a plurality of servers usable by the VM system having migrated from the copy source site #A may exist at the copy destination site #B, in which case a similar calculation may be performed for each server for a case where the server is shared. Furthermore, in addition to servers, addition may only be performed on shared resources defined in advance among shared resources such as the CPU 2500 and the storage I/F 2600, and when a selection can be made during the migration of the VM system to the copy destination site #B, a calculation may be performed on each shared resource at the copy destination site #B.

Next, the adjustment scheme generation program 1190B refers to a resource amount table 1124B and acquires an amount of hardware resources that are monitoring targets used by the VOL and by components having a performance dependence relationship with the VOL (step 8402).

The adjustment scheme generation program 1190B compares the addition values of the performance level values and resource amounts obtained in step 8401 with the resource amounts obtained in step 8403 (step 8403).

When the addition values do not exceed the resource amounts, the operation may be restarted using the copy destination. Therefore, the adjustment scheme generation program 1190B determines that resource adjustment is not necessary with respect to the copy destination site #B and ends the present process 8400. For example, while the addition values obtained in step 8401 with respect to the site #B are the number of CPU cores "16" and the memory amount "64", the resource amounts acquired in step 8402 are the number of CPU cores "8" and the memory amount "16". Since both the number of CPU cores and the memory amount exceed the resource amounts, processes of step 8404 and thereafter are to be performed.

When the addition values exceed the resource amounts, the adjustment scheme generation program 1190B determines whether or not there is usable free space in a target (for example, a component/resource) of a same type as the monitoring target which is assigned a resource of a same type as a resource used by a component having a performance dependence relationship with the VOL (step 8404). When a result of the determination in step 8404 is positive, the adjustment scheme generation program 1190B generates an adjustment scheme which uses the target (step 8405). For example, when a logical space 2220B is shared and the addition value obtained in step 8401 exceeds a resource amount of the logical space, the adjustment scheme generation program 1190B determines whether or not there is free space in another logical space and generates an adjustment scheme (for example, a scheme to perform data migration to a logical space having free space in its resources). In doing so, when there is a free resource in a system operable at another site in the VM system having been running at the copy destination site #B, a resource of another site may be used by consecutively changing sites to be used.

Next, the adjustment scheme generation program 1190B acquires information on tasks using a physical resource of which an addition amount exceeds a resource amount from the task table 1130B and determines whether or not there is a task which enables a processing timing to be adjusted (step 8406). At this point, tasks due to user input such as a configuration of VM migration based on operational circumstances and a backup configuration based on an operation policy of a corporation may be determined not adjustable while tasks executed inside an apparatus such as defragmentation may be determined adjustable. However, these are not restrictive and in the case of a resource related to a server being used in a system of which the importance 121A is high (for example, importance is "High"), another task executed at a time point at which the resource amount is exceeded may be unconditionally determined to be adjustable. When a result of the determination in step 8406 is positive, the adjustment scheme generation program 1190B generates an adjustment scheme of task execution contents (step 8407). For example, the adjustment scheme generation program 1190B checks whether or not the sum (addition value) of performance level values obtained in step 8401 exists at a time during which a separately executed task such as a periodically executed virus scanning process or a backup process exceeds a resource amount and generates an adjustment scheme which changes a schedule so that the process is executed in a different time slot. Moreover, the generation of an adjustment scheme in step 8407 may be performed only when an adjustment scheme cannot be generated in step 8405 or may be performed even when step 8405 has been performed.

Subsequently, the adjustment scheme generation program 1190B generates an adjustment scheme which adjusts resource allocation amounts of the system having migrated from the copy source site due to the disaster and the system of the copy destination site B while maintaining an allocation ratio of each system (step 8408). At this point, by using information in the performance trend table 1122B shown in FIG. 8 or the resource amount table 1124B shown in FIG. 9, information on a resource amount ratio at each server, which is necessary to operate a system designed at the copy source site #A (or a system accumulated through operations at the copy source site #A) without incident, can be utilized. Moreover, the generation of an adjustment scheme in step 8408 may be performed only when an adjustment scheme cannot be generated in both step 8405 and step 8407 or may be performed even when any of step 8405 and step 8407 has been performed.

For example, in the example described with reference to step 8401, with respect to a CPU shared by the VOL #LV7, the VOL #LV8, the VOL #LV11, and the VOL #LV12, a performance level value of "3" for "00:00 to 08:00", a performance level value of "6" for "08:00 to 08:30", a performance level value of "12" for "08:30 to 09:00", a performance level value of "13" for "09:00 to 12:00", a performance level value of "15" for "12:00 to 17:30", and a performance level value of "10" for "17:30 to 24:00" are respectively obtained. A maximum usage thereof is the performance level value "15" (Max 150 K) for "12:00 to 17:30". In this example, usage of the CPU is 80 K (not shown).

In this case, the adjustment scheme generation program 1190B generates a scheme for performing resource adjustment so that the VOL #LV7 and the VOL #LV8 and the VOL #LV5, and the VOL #LV11 and the VOL #LV12 which constitute a 1VM system respectively maintain a same resource usage ratio. In the case of this example, by uniformly reducing an I/O amount using the CPU by 50%, the IOPS can be brought down to 75 K or lower and usage of the CPU can be kept to 80 K or lower. While IOPS is uniformly reduced by 50% in this case, alternatively, reduction amounts may differ (may be weighted) according to systems such as applying a reduction by 20% to a system with high priority, a reduction by 40% to a system with middle priority, and a reduction by 70% to a system with low priority in accordance with (a) an importance transmitted from the copy source site in the performance related information sharing process (an importance of each system) or (b) an importance managed separately across sites in advance (an importance of each system). Moreover, at this point, adjustment schemes may be narrowed down by checking to see whether or not a value as a result of reducing the resource amount is larger than a minimum operation value 225B of the performance trend table 1122B and, if not, a scheme is not generated since requirements are not satisfied.

While the minimum operation value 225B is prepared only in the performance trend table 1122B in this case, the resource amount table 1124B may also be provided with a column for a minimum operation value and a necessary minimum memory capacity or the like may be stored, whereby the necessary minimum memory capacity may be used as a narrowing-down condition when generating adjustment schemes in the present step 8409.

Furthermore, for example, the adjustment scheme generation program 1190B combines and stores adjustment schemes of each resource generated in steps 8405, 8407, and 8408 in a resource adjustment scheme table 1140B (step 8409), and ends the resource adjustment scheme generation process 8400. Since the resource adjustment scheme table 1140B stores information similar to those on an adjustment scheme screen 9100B to be described later, a description thereof will be omitted.

FIG. 17 is a flow chart of a resource adjustment process 8500.

The pair configuration confirmation process 8500 is a process of presenting adjustment schemes generated by the adjustment scheme generation program 1190B, accepting an input, and executing an adjustment scheme. The present process is performed by an adjustment scheme presentation program 11A0B.

First, the adjustment scheme presentation program 11A0B refers to the resource adjustment scheme table 1140B (step 8501). Next, the adjustment scheme presentation program 11A0B determines whether or not there are one or more resource adjustment schemes (step 8502).

When a result of the determination in step 8502 is positive, the adjustment scheme presentation program 11A0B presents the resource adjustment schemes to the user via an output device 1400B and accepts an input regarding which is to be executed among the resource adjustment schemes (step 8503). Based on the input, the adjustment scheme presentation program 11A0B transmits an execution request to a resource adjustment program 11B0B or a task adjustment program 11C0B (step 8504). Alternatively, the presentation of adjustment schemes may be skipped and step 8504 may be performed after a resource adjustment scheme is input or automatically selected according to a policy such as "Prioritize task adjustment processing" and "Prioritize use of available resource".

When the result of the determination in step 8502 is negative, when there is no input for a prescribed time in step 8503 or when there is an input to end the resource adjustment process in step 8503, the adjustment scheme presentation program 11A0B notifies the user of a warning that the system is to be stopped (or a warning of a possibility that the system may not operate normally) (step 8505).

FIG. 18 is a configuration diagram of an adjustment scheme screen 9100B.

The adjustment scheme screen 9100B is a screen which is presented in step 8501 shown in FIG. 17. The screen 9100B includes a display area 9101B showing a list of resource adjustment schemes to be candidates of execution, a display area 9102B showing information on systems to be affected when a resource adjustment scheme is executed, a display area 9103B showing information on components to be affected when a resource adjustment scheme is executed, a display area 9104B showing affected contents of the components to be affected, an adjustment scheme detail button 9107B for displaying details of a resource adjustment scheme, and an adjustment scheme execution button 9108B for executing an adjustment scheme. The display area 9104B showing affected contents of the components to be affected includes a display area 9105B showing an affected metric and a display area 9106B showing a degree of effect.

In the present embodiment, the list of resource adjustment schemes includes an adjustment scheme 1 for only performing a resource allocation change, an adjustment scheme 2 for performing a resource allocation change and performing a task schedule change, and an adjustment scheme 3 for performing a VOL migration and a VM migration. Performance is not affected in the case of the adjustment scheme 2 and the adjustment scheme 3. Therefore, the screen 9100B does not present information regarding the affected metric 9105B and the effect 9106B and respectively shows an effect that a start time point of a task is to be changed and an effect that a physical resource used by a VOL or a VM is to be changed as the affected contents 9104B.

In this case, an order of arrangement of the adjustment schemes may be an order based on features of the adjustment schemes such as a descending order of estimated values when assuming that the adjustment schemes are executed or an ascending order of times required to execute the adjustment schemes. In addition, while specific amounts of change are shown as the degree of effect 9106B of the affected contents 9104B in the present embodiment, this is not restrictive and the degree of the effect may be displayed using multilevel symbols such as "o", "Δ", and "x". Furthermore, while a VOL and a VM are presented as affected components in the present embodiment, other values such as a logical space and other components may be displayed. In addition, while an IOPS, a CPU, and a memory are presented as affected metrics, other values such as an I/O response time and other metrics may be displayed.

FIG. 19 is a configuration diagram of an example of an adjustment scheme detail screen 9200B.

The present screen 9200B is a screen that is displayed when any of the adjustment schemes in the display area 9101B showing the list of adjustment schemes is selected and the adjustment scheme detail button 9107B is subsequently pressed on the adjustment scheme screen 9100B shown in FIG. 18. The screen 9100B shows detail information of a selected adjustment scheme.

The adjustment scheme detail screen 9200B includes a display area 9201B showing a list of resource adjustment schemes to be candidates of execution, a display area 9202B showing information on systems to be affected when a resource adjustment scheme is executed, a display area 9203B showing a change in a resource allocation amount to a storage accompanying resource adjustment, a display area 9204B showing a change in a resource allocation amount to a server, and an adjustment scheme execution button 9210B for executing an adjustment scheme. The display areas 9203B and 9204B include display areas respectively showing an ID of a monitoring target of which an allocation amount of a resource changes (9204B, 9208B), an ID of a monitoring target which retains an allocated resource (9205B, 9209B), and an amount of change in an allocated resource (9206B, 9210B, and 9211B). In the present embodiment, the adjustment scheme screen 9100B in FIG. 18 shows an example in which a "resource allocation change scheme" displayed at the top of the resource adjustment scheme candidates (display area) 9101B. The present example represents an example of a performance trend of three VOLs (LV5, LV7, and LV8) used by a system Y running at the copy source site A where, due to a change in resource allocation, from respective original maximum IOPS of 20 K, 50 K, and 40 K, usage is limited in half to 10 K, 25 K, and 20 K. In addition, an example is shown of a performance trend of two VOLs (LV11 and LV12) used by a system B running at the copy destination site B where, from respective original maximum IOPS of 30 K, usage is limited in half to 15 K. As a method of applying a limit to resource use, any method may be adopted such as using a function of a storage apparatus or including an ID of an I/O destination VOL in an I/O request from a server (host). Furthermore, an example is shown of a performance trend of three VMs (VM5, VM7, and VM8) used by the system Y running at the copy source site A where virtual CPUs are respectively reallocated at half and virtual memories are respectively reallocated at ¼. Moreover, an example is shown of a performance trend of two VMs (VM11 and VM12) used by the system B running at the copy destination site B where virtual CPUs are respectively reallocated at half and virtual memories are respectively reallocated at ¼. In this case, resource adjustment is performed so as to fall within the values shown in the resource amount table in FIG. 10. While an example of adjusting a CPU resource, a memory amount, and an IOPS amount that can be processed by a CPU has been shown in FIGS. 18 and 19 in the present embodiment, resource adjustment is not limited thereto.

Alternatively, for example, a configuration may be adopted in which changes due to adjustment are displayed in a time-sequential stacked graph format in the display area 9104B showing affected contents in FIG. 18, the display area 9203B showing a change in a resource allocation amount to a storage in FIG. 19, and the display area 9204B showing a change in a resource allocation amount to a server in FIG. 19.

FIGS. 18 and 19 represent examples of screens and, as effects caused by the execution of an adjustment scheme, information representing other characteristics may also be displayed such as information on a time required to execute the adjustment scheme, a cost required to execute the adjustment scheme, a cost per unit time required for configuration after executing the adjustment scheme, and an expected duration of the configuration without changes thereto after executing the adjustment scheme. Accordingly, a manager can make a selection based on his or her own criteria from a plurality of resource adjustment schemes with different characteristics. In addition, the information can also be referred to as an index regarding how much time and cost need to be devoted for the recovery of a copy source site.

According to the embodiment described above, by extracting a performance trend and a resource usage ratio of systems from performance information of a copy source site #A related to a pair and repetitively (for example, periodically) sharing the performance trend and the resource usage ratio with a management server 1000B of a copy destination site #B, resource adjustment can be performed at the copy destination site #B upon an occurrence of a disaster in consideration of an operation having migrated due to the occurrence of the disaster and an operation originally running at the copy destination site #B. As a result, when continuing an operation of a disaster-affected site at the copy destination site #B, a decline in performance of the operation can be mitigated.

While an embodiment has been described above, it is to be understood that the described embodiment merely represents an example for illustrating the present invention and that the scope of the present invention is not limited to the embodiment. The present invention can be implemented in various other modes.

REFERENCE SIGNS LIST

1000 Management server
2000 Storage apparatus
3000 Server

The invention claimed is:

1. A management system, comprising:
an interface device coupled to at least a second computer system among a plurality of sites including a first site which includes a first computer system and a second site which includes the second computer system;
a storage unit configured to store management information including second performance related information; and
a processor coupled to the interface device and the storage unit,
the first computer system being configured to have a first resource group, execute a first operation, and provide a plurality of logical volumes which include a first logical volume to be an I/O destination of the first operation,
the second computer system being configured to have a second resource group, execute a second operation, and provide a plurality of logical volumes which include a second logical volume that is a copy destination of the first logical volume and a third logical volume to be an I/O destination of the second operation,
the second performance related information including information related to a resource related to the second operation among the second resource group, and
the processor being configured to:
receive first performance related information including information related to a resource, among the first resource group of the first site, related to the first operation which the first logical volume that is a copy source of the second logical volume is associated as I/O destination;
store the received first performance related information in the storage unit; and
when the first operation migrates from the first site to the second site, perform reallocation of resources of the second site based on both the first performance related information and the second performance related information;
the first computer system managed by a first management computer which is included in the first site,
the first management computer is configured to store first management information which is management information including:
information related to a pair of logical volumes,
information representing an enabled function among functions retained by the first site and functions retained by each site other than the first site,
the first management computer is configured to:
identify one or more sites having a same function as the enabled function at the first site based on the configuration information; and
display information related to the one or more identified sites,
the second site is a site selected from the one or more displayed sites, and
the second logical volume is a logical volume selected from the plurality of logical volumes included in the second site.

2. The management system according to claim 1, wherein
the first performance related information includes first performance trend information which is information including a performance level value of a component related to a resource related to the first operation and a time to which the performance level value belongs,
the second performance related information includes second performance trend information which is information including a performance level value of a component related to a resource related to the second operation and a time to which the performance level value belongs, and
the processor is configured to:
perform a calculation using a performance level value identified from the first performance trend information and a performance level value identified from the second performance trend information based on a time identified from the first performance trend information and a time identified from the second performance trend information; and
perform the reallocation in a case of exceeded resources which is a state where a value calculated as a result of the calculation exceeds a threshold in accordance with a resource restriction of the second site.

3. The management system according to claim 2, wherein
the first performance related information includes first allocated resource information which is information including information representing an amount of resources related to the first operation for each resource type, the second performance related information includes second allocated resource information which is information including information representing an amount of resources related to the second operation for each resource type, and the processor is configured to refer to the first allocated resource information and the second allocated resource information and perform the reallocation such that a resource amount ratio related to the first operation and a resource amount ratio related to the second operation are both maintained.

4. The management system according to claim 1, wherein the processor is configured to:

generate one or more reallocation schemes based on both the first performance related information and the second performance related information;

display the one or more reallocation schemes; and receive a selection of an execution target reallocation scheme among the one or more reallocation schemes, the reallocation being a reallocation in accordance with a reallocation scheme corresponding to the received selection.

5. The management system according to claim 4, wherein the management information includes configuration information which is information related to a configuration of at least the second resource group among a plurality of resource groups respectively included in the plurality of sites, and the processor is configured to:

determine whether or not a usable free resource related to a component of a same type as a component related to the first operation and the second operation exists in a target resource group which is a resource group of any site other than the first site based on the configuration information, the first performance related information and the second performance related information; and generate a component migration as a reallocation scheme when a result of the determination is positive, the component migration is to associate, in place of a resource associated with at least one component of a same type, the usable free resource in the target resource group with the at least one component of a same type.

6. The management system according to claim 4, wherein the processor is configured to:

determine whether or not there is a task of which an execution start timing can be changed among one or more tasks using a resource corresponding to the threshold related to the exceeded resources; and when a result of the determination is positive, generate a reallocation scheme including changing the execution start timing of the task of which the execution start timing can be changed to any time point other than a time corresponding to the exceeded resources.

7. The management system according to claim 1, wherein the reallocation is to respectively reduce an amount of resources allocated to the first operation as a component and an amount of resources allocated to the second operation as a component while maintaining both a resource amount ratio related to the first operation and a resource amount ratio related to the second operation.

8. The management system according to claim 7, wherein a migration target is a first operation system which is a set of one or more operations including the first operation, the second computer system is configured to be executing a second operation system which is a set of one or more operations including the second operation, and the processor is configured to determine an amount of reduction of a resource amount allocated to the first operation system and an amount of reduction of a resource amount allocated to the second operation system based on an importance of the first operation system and an importance of the second operation system.

9. The management system according to claim 1, comprising:

a second management computer which manages the second computer system and which is included in the second site, wherein the second management computer includes the interface device, the storage unit, and the processor, and the first management computer is configured to select, based on the first management information, the second management computer in the second site including the second logical volume which constitutes a pair with the first logical volume as a transmission destination of first performance related information including information related to a resource related to the first operation having the first logical volume as an I/O destination.

10. The management system according to claim 9, wherein the first performance related information does not include information related to a resource related to operations not migrated to the second site among the first resource group.

11. The management system according to claim 9, wherein the first management computer is configured to:

repetitively issue an inquiry about whether or not a same function as the enabled function at the first site is disabled or has been deleted at the second site to the second management computer; and issue an alert when a positive response is received.

12. The management system according to claim 1, wherein the processor is configured to update the management information, the updated management information indicates that, with respect to a same function as the enabled function at the first site among functions included in the second site, the function is enabled and a same function as the function is also enabled at another site having the second site as an operation migration destination, when an indication to disable or delete a function is received, the processor is configured to:

determine whether or not a function corresponding to the received indication is enabled and a same function as the function is also enabled at another site having the second site as an operation migration destination based on the management information; and issue an alert when a result of the determination is positive.

13. The management system according to claim 1, wherein
the management information includes information representing a first management format which is a management format of at least a first site among the plurality of sites, and
the processor is configured to:
receive the first performance related information from the first site;
determine whether or not the first management format and a second management format which is a management format at the second site differ from each other based on the management information;
when a result of the determination is positive, convert the first performance related information based on a difference between the first management format and the second management format; and
store the converted first performance related information in the storage unit.

14. A management method of at least a second computer system among a plurality of sites including a first site which includes a first computer system and a second site which includes the second computer system,
the first computer system being configured to have a first resource group, execute a first operation, and provide a plurality of logical volumes which include a first logical volume to be an I/O destination of the first operation,
the second computer system being configured to have a second resource group, execute a second operation, and provide a plurality of logical volumes which include a second logical volume that is a copy destination of the first logical volume and a third logical volume to be an I/O destination of the second operation, and
the management method comprising:
receiving first performance related information including information related to a resource, among the first resource group of the first site, related to the first operation with which the first logical volume that is a copy source of the second logical volume is associated as I/O destination;
storing the received first performance related information; and
when the first operation migrates from the first site to the second site, performing reallocation of resources of the second site based on both the first performance related information and second performance related information which includes information related to a resource related to the second operation among the second resource group,
a first management computer which manages the first computer system and which is included in the first site; and
a second management computer which manages the second computer system and which is included in the second site, wherein
the second management computer includes the interface device, the storage unit, and the processor,
the first management computer is configured to store first management information which is management information including information related to a pair of logical volumes,
the first management computer is configured to select, based on the first management information, the second management computer in the second site including the second logical volume which constitutes a pair with the first logical volume as a transmission destination of first performance related information including information related to a resource related to the first operation having the first logical volume as an I/O destination;
the first management information includes information representing an enabled function among functions retained by the first site and functions retained by each site other than the first site,
the first management computer is configured to:
identify one or more sites having a same function as the function enabled at the first site based on the configuration information; and
display information related to the one or more identified sites,
the second site is a site selected from the one or more displayed sites, and
the second logical volume is a logical volume selected from the plurality of logical volumes included in the second site.

* * * * *